US012069551B2

(12) United States Patent
Liu et al.

(10) Patent No.: US 12,069,551 B2
(45) Date of Patent: Aug. 20, 2024

(54) SERVICE CONNECTION ESTABLISHMENT METHOD, BLUETOOTH MASTER DEVICE, CHIP, AND BLUETOOTH SYSTEM

(71) Applicant: HUAWEI TECHNOLOGIES CO., LTD., Guangdong (CN)

(72) Inventors: Xiuhua Liu, Shenzhen (CN); Yongmin Niu, Shenzhen (CN); Nengfu Tang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 434 days.

(21) Appl. No.: 17/600,761

(22) PCT Filed: Mar. 28, 2020

(86) PCT No.: PCT/CN2020/081897
§ 371 (c)(1),
(2) Date: Oct. 1, 2021

(87) PCT Pub. No.: WO2020/200127
PCT Pub. Date: Oct. 8, 2020

(65) Prior Publication Data
US 2022/0201453 A1 Jun. 23, 2022

(30) Foreign Application Priority Data

Apr. 2, 2019 (CN) .......................... 201910263416.5
May 30, 2019 (CN) .......................... 201910462292.3

(51) Int. Cl.
*H04W 4/80* (2018.01)
*H04W 76/14* (2018.01)

(52) U.S. Cl.
CPC ............. *H04W 4/80* (2018.02); *H04W 76/14* (2018.02)

(58) Field of Classification Search
CPC ..... H04W 84/20; H04W 12/069; H04W 4/80; H04W 76/14; H04W 12/50; H04W 76/15;
(Continued)

(56) References Cited

U.S. PATENT DOCUMENTS 7,523,104 B2* 4/2009 Tanigawa ................ G06F 16/80
707/999.005
9,088,961 B1* 7/2015 Davis ...................... H04W 4/80
(Continued)

FOREIGN PATENT DOCUMENTS

CN 1635713 A 7/2005
CN 103235680 A 8/2013
(Continued)

OTHER PUBLICATIONS

International Search Report and Written Opinion issued in PCT/CN2020/081897, dated Jun. 17, 2020, 12 pages.
(Continued)

*Primary Examiner* — Cindy Trandai

(57) ABSTRACT

This application provides a service connection establishment method, a Bluetooth master device, and a chip. After scanning a device combination including at least two Bluetooth slave devices, the Bluetooth master device, if required to establish a service connection with each of Bluetooth slave devices in the device combination, needs to do as follows: in a pairing phase, the Bluetooth master device automatically pairs with another Bluetooth slave device in the device combination after completing pairing with one Bluetooth slave device in the device combination; in a service connection establishment phase, similarly, the Bluetooth master device automatically establishes a service connection with another Bluetooth slave device in the device combination after establishing a service connection with one Bluetooth slave device in the device combination. This is a
(Continued)

simple process, and a speed of service connection establishment is high.

20 Claims, 21 Drawing Sheets

(58) Field of Classification Search
CPC ....... H04W 8/005; H04W 8/24; H04W 84/18; H04W 76/30; H04W 76/19; H04W 88/02
See application file for complete search history.

(56) References Cited

U.S. PATENT DOCUMENTS

| | | | |
|---|---|---|---|
| 9,998,897 B2* | 6/2018 | Kang | H04W 8/005 |
| 10,656,795 B1* | 5/2020 | Pandian | G06F 3/0482 |
| 10,797,895 B2* | 10/2020 | Moorefield, Jr. | H04L 12/1822 |
| 2009/0055903 A1* | 2/2009 | Inose | G06F 21/41 726/4 |
| 2010/0195539 A1* | 8/2010 | Tian | H04W 76/15 370/255 |
| 2011/0063103 A1 | 3/2011 | Lee et al. | |
| 2012/0071093 A1 | 3/2012 | Wright et al. | |
| 2012/0135683 A1* | 5/2012 | Lee | H04L 63/101 455/41.2 |
| 2013/0201915 A1* | 8/2013 | Wang | H04W 76/15 370/328 |
| 2013/0316649 A1 | 11/2013 | Newham | |
| 2014/0155050 A1* | 6/2014 | Choi | H04W 4/80 455/418 |
| 2015/0334188 A1* | 11/2015 | Chiba | H04W 4/08 709/204 |
| 2017/0272270 A1* | 9/2017 | Gu | H04B 17/318 |
| 2018/0103338 A1* | 4/2018 | Lu | H04W 84/18 |
| 2018/0160284 A1 | 6/2018 | Lim et al. | |
| 2019/0342743 A1 | 11/2019 | Marchand et al. | |
| 2020/0082699 A1* | 3/2020 | Jati | G08B 21/18 |
| 2021/0187223 A1* | 6/2021 | Sing | A61M 16/0833 |
| 2021/0256979 A1* | 8/2021 | Zhang | G10L 17/22 |

FOREIGN PATENT DOCUMENTS

| | | |
|---|---|---|
| CN | 103385013 A | 11/2013 |
| CN | 103501387 A | 1/2014 |
| CN | 105337621 A | 2/2016 |
| CN | 105471481 A | 4/2016 |
| CN | 105744466 A | 7/2016 |
| CN | 106063362 A | 10/2016 |
| CN | 106102129 A | 11/2016 |
| CN | 106209174 A | 12/2016 |
| CN | 107172572 A | 9/2017 |
| CN | 107566229 A | 1/2018 |
| CN | 108271143 A | 7/2018 |
| CN | 108684024 A | 10/2018 |
| CN | 108696843 A | 10/2018 |
| CN | 108738003 A | 11/2018 |
| CN | 109005532 A | 12/2018 |
| CN | 109246662 A | 1/2019 |
| CN | 110191450 A | 8/2019 |
| CN | 110519762 A | 11/2019 |

OTHER PUBLICATIONS

Office Action issued in CN201910462292.3, dated Mar. 11, 2020, 12 pages.
Office Action issued in CN202080018685.6, dated Jan. 24, 2022, 12 pages.
European Patent Office Extended Search Report dated Mar. 25, 2022 for Application No. 20781791.7, 8 pages.

* cited by examiner

SERVICE CONNECTION ESTABLISHMENT METHOD, BLUETOOTH MASTER DEVICE, CHIP, AND BLUETOOTH SYSTEM

CROSS REFERENCE TO RELATED APPLICATION(S)

This application is a national stage of International Application No. PCT/CN2020/081897, filed on Mar. 28, 2020, which claims priority to Chinese Patent Application No. 201910263416.5, filed on Apr. 2, 2019 and Chinese Patent Application No. 201910462292.3, filed on May 30, 2019. All of the aforementioned applications are hereby incorporated by reference in their entireties.

TECHNICAL FIELD

Embodiments of this application relate to the field of Bluetooth technologies, and in particular, to a service connection establishment method, a Bluetooth master device, a chip, and a Bluetooth system.

BACKGROUND

With development of Bluetooth technologies, various mobile devices, intelligent household appliance devices, and intelligent wearable devices all have a Bluetooth communication function, and these devices having the Bluetooth function are collectively referred to as Bluetooth devices.

In a service connection process, a user enables the Bluetooth function of the Bluetooth device (e.g., a Bluetooth master device). Other surrounding Bluetooth devices (e.g., Bluetooth slave devices) are scanned by using the Bluetooth master device. After the scanning is completed, the scanned Bluetooth slave devices are displayed on an operation interface of the Bluetooth master device. Then, the user manually selects a target Bluetooth device in the Bluetooth slave devices for pairing, and establishes a service connection after the pairing succeeds, to transmit data.

In some scenarios, a service connection needs to be established between the Bluetooth master device and the plurality of Bluetooth slave devices. In this case, the user needs to select the Bluetooth slave devices on the operation interface one by one for pairing, and establishes a plurality of service connections. This is a complex and time-consuming operation process.

SUMMARY

Embodiments of this application provide a service connection establishment method, a Bluetooth master device, a chip, and a Bluetooth system. A service connection between the Bluetooth master device and each of a plurality of Bluetooth slave devices is completed by using a one-click operation. This is a simple process, and a speed of the service connection is high.

According to a first aspect, an embodiment of this application provides a Bluetooth master device, including a processor, a memory, and a computer program that is stored in the memory and that can be run on the processor. When executing the program, the processor performs the following steps: receiving a first operation entered by a user, where the first operation is used to request to enable a Bluetooth function; displaying tag information of a scanned device combination, where the device combination includes a first Bluetooth slave device and a second Bluetooth slave device; receiving a second operation entered by the user, where the second operation is used to request the Bluetooth master device to pair with each of Bluetooth slave devices in the device combination; pairing with each of the Bluetooth slave devices in the device combination; and establishing a service connection with each of the Bluetooth slave devices in the device combination. In this solution, after scanning the device combination including at least two Bluetooth slave devices, the Bluetooth master device, if required to establish a service connection with each of the Bluetooth slave devices in the device combination, needs to do as follows: in a pairing phase, after completing pairing with one Bluetooth slave device in the device combination, the Bluetooth master device automatically performs pairing with another Bluetooth slave device in the device combination until completing pairing with each of the Bluetooth slave devices in the device combination; in a service connection establishment phase, similarly, after establishing a service connection with one Bluetooth slave device in the device combination, the Bluetooth master device automatically establishes a service connection with another Bluetooth slave device in the device combination until establishing a service connection with each of the Bluetooth slave devices in the device combination. In this process, the scanned Bluetooth slave devices do not need to be manually selected one by one, and the Bluetooth master device automatically pairs with each Bluetooth slave device and establishes a service connection. This is a simple process, and a speed of service connection establishment is high.

In a feasible design, the tag information is included in a scanning result of the first Bluetooth slave device, and before the displaying tag information of a scanned device combination, the processor further performs the following step: storing address information of the second Bluetooth slave device, where the address information is included in a scanning result of the second Bluetooth slave device. In this solution, the Bluetooth master device stores address information of each Bluetooth slave device, and sends, based on the address information, a pairing request to a corresponding Bluetooth slave device during subsequent pairing, so as to automatically pair with each Bluetooth slave device.

In a feasible design, the pairing with each of the Bluetooth slave devices in the device combination includes: pairing with the first Bluetooth slave device; determining whether the pairing with the first Bluetooth slave device is completed; and if the pairing with the first Bluetooth slave device is completed, automatically pairing with the second Bluetooth slave device based on the address information of the second Bluetooth slave device. In this solution, the Bluetooth master device automatically pairs with the Bluetooth slave devices in the device combination.

In a feasible design, the service connection includes a plurality of sub-states, and the establishing a service connection with each of Bluetooth slave devices in the device combination includes: separately executing a first sub-state with the first Bluetooth slave device and the second Bluetooth slave device; and after the separately executing a first sub-state with the first Bluetooth slave device and the second Bluetooth slave device, separately executing a second sub-state with the first Bluetooth slave device and the second Bluetooth slave device, where the first sub-state and the second sub-state are different sub-states among the plurality of sub-states. In this solution, the Bluetooth master device establishes service connections with the Bluetooth slave devices.

In a feasible design, the service connection includes a plurality of sub-states, and the establishing a service connection with each of Bluetooth slave devices in the device combination includes: executing all of the plurality of sub-states with the first Bluetooth slave device; and after the executing all of the plurality of sub-states with the first Bluetooth slave device, executing all of the plurality of sub-states with the second Bluetooth slave device. In this solution, a service connection process between the Bluetooth master device and each of the Bluetooth slave devices in the device combination is independently completed, and service logic establishment logic of a single Bluetooth slave device is not changed.

In a feasible design, the establishing a service connection with each of Bluetooth slave devices in the device combination is pairing with each of Bluetooth slave devices in the device combination based on a sequence of scanned Bluetooth slave devices in the device combination. In this solution, the Bluetooth master device sequentially pairs with each of Bluetooth slave devices in the device combination.

According to a second aspect, an embodiment of this application provides a Bluetooth system, including the Bluetooth master device and the device combination implemented in any one of the first aspect or the possible implementations of the first aspect. The device combination includes a first Bluetooth slave device and a second Bluetooth slave device.

According to a third aspect, an embodiment of this application provides a chip. The chip includes a processor and an interface. The interface is configured to receive a code instruction and transmit the code instruction to the processor. The processor runs the code instruction to perform the following steps: receiving a first operation entered by a user, where the first operation is used to request to enable a Bluetooth function; displaying tag information of a scanned device combination, where the device combination includes a first Bluetooth slave device and a second Bluetooth slave device; receiving a second operation entered by the user, where the second operation is used to request the Bluetooth master device to pair with each of Bluetooth slave devices in the device combination; pairing with each of Bluetooth slave devices in the device combination; and establishing a service connection with each of Bluetooth slave devices in the device combination. In this solution, the user does not need to manually select scanned Bluetooth slave devices one by one, and the Bluetooth master device automatically pairs with each Bluetooth slave device and establishes a service connection. This is a simple process, and a speed of the service connection establishment is high.

In a feasible design, the tag information is included in a scanning result of the first Bluetooth slave device, and before the displaying tag information of a scanned device combination, address information of the second Bluetooth slave device is further stored, where the address information is included in a scanning result of the second Bluetooth slave device. In this solution, the Bluetooth master device stores address information of each Bluetooth slave device, and sends, based on the address information, a pairing request to a corresponding Bluetooth slave device during subsequent pairing, so as to automatically pair with each Bluetooth slave device.

In a feasible design, the pairing with each of Bluetooth slave devices in the device combination includes: pairing with the first Bluetooth slave device; determining whether the pairing with the first Bluetooth slave device is completed; and if the pairing with the first Bluetooth slave device is completed, automatically pairing with the second Bluetooth slave device based on the address information of the second Bluetooth slave device. In this solution, the Bluetooth master device automatically pairs with the Bluetooth slave devices in the device combination.

In a feasible design, the service connection includes a plurality of sub-states, and the establishing a service connection with each of Bluetooth slave devices in the device combination includes: separately executing a first sub-state with the first Bluetooth slave device and the second Bluetooth slave device; and after separately executing the first sub-state with the first Bluetooth slave device and the second Bluetooth slave device, separately executing a second sub-state with the first Bluetooth slave device and the second Bluetooth slave device, where the first sub-state and the second sub-state are different sub-states among the plurality of sub-states. In this solution, the Bluetooth master device establishes service connections with the Bluetooth slave devices.

In a feasible design, the service connection includes a plurality of sub-states, and the establishing a service connection with each of Bluetooth slave devices in the device combination includes: executing all of the plurality of sub-states with the first Bluetooth slave device; and after executing all of the plurality of sub-states with the first Bluetooth slave device, executing all of the plurality of sub-states with the second Bluetooth slave device. In this solution, a service connection process between the Bluetooth master device and each of Bluetooth slave devices in the device combination is independently completed, and service logic establishment logic of a single Bluetooth slave device is not changed.

In a feasible design, the establishing a service connection with each of Bluetooth slave devices in the device combination includes pairing with each of Bluetooth slave devices in the device combination based on a sequence of scanned Bluetooth slave devices in the device combination. In this solution, the Bluetooth master device sequentially pairs with each of Bluetooth slave devices in the device combination.

According to a fourth aspect, an embodiment of this application provides a service connection establishment method, applicable to a Bluetooth master device, where the Bluetooth master device includes a Bluetooth application module and a Bluetooth protocol stack, and the method includes: receiving, by the Bluetooth application module, a first operation entered by a user, where the first operation is used to request to enable a Bluetooth function; sending, by the Bluetooth application module, a scanning request to the Bluetooth protocol stack, where the scanning request is used to request the Bluetooth protocol stack to perform Bluetooth scanning; reporting, by the Bluetooth protocol stack, a scanning result to the Bluetooth application module, where the scanning result is a scanning result of any one of a first Bluetooth slave device and a second Bluetooth slave device, and the first Bluetooth slave device and the second Bluetooth slave device are included in a same device combination; controlling, by the Bluetooth application module, a user interface of the Bluetooth master device to display tag information of the device combination, where the tag information of the device combination is carried in the scanning result; receiving, by the Bluetooth application module, a second operation entered by the user, where the second operation is used to request the Bluetooth protocol stack to pair with each of Bluetooth slave devices in the device combination; receiving, by the Bluetooth application module, a pairing result from the Bluetooth protocol stack, where the pairing result is sent after the Bluetooth protocol stack is paired with each of Bluetooth slave devices in the device combination, and the pairing result is a pairing result of any Bluetooth slave device in the first Bluetooth slave device and the second Bluetooth device; and establishing, by the Bluetooth protocol stack, a service connection with each of Bluetooth slave devices in the device combination. In this solution, the user does not need to manually select scanned Bluetooth slave devices one by one, and the Bluetooth master device automatically pairs with each Bluetooth slave device and establishes a service connection. This is a simple process, and a speed of the service connection establishment is high.

In a feasible design, the scanning result is a scanning result of the first Bluetooth slave device, and after the reporting, by the Bluetooth protocol stack, a scanning result to the Bluetooth application module, the method further includes: storing, by the Bluetooth protocol stack, address information of the second Bluetooth slave device, where the address information is included in a scanning result of the second Bluetooth slave device. In this solution, the Bluetooth master device stores address information of each Bluetooth slave device, and sends, based on the address information, a pairing request to a corresponding Bluetooth slave device during subsequent pairing, so as to automatically pair with each Bluetooth slave device.

In a feasible design, before the receiving, by the Bluetooth application module, a pairing result from the Bluetooth protocol stack, the method further includes: pairing, by the Bluetooth protocol stack, with the first Bluetooth slave device; determining, by the Bluetooth protocol stack, whether the pairing with the first Bluetooth slave device is completed; and if the Bluetooth protocol stack determines that the pairing with the first Bluetooth slave device is completed, automatically pairing with the second Bluetooth slave device based on the address information of the second Bluetooth slave device. In this solution, in a pairing stage, the Bluetooth master device automatically completes pairing with each of Bluetooth slave devices in the device combination, without manual selection by the user, and this is a simple process and a pairing speed is high.

In a feasible design, the service connection includes a plurality of sub-states, and the establishing, by the Bluetooth protocol stack, a service connection with each of Bluetooth slave devices in the device combination includes: separately executing, by the Bluetooth protocol stack, a first sub-state with the first Bluetooth slave device and the second Bluetooth slave device; and after the Bluetooth protocol stack separately executes the first sub-state with the first Bluetooth slave device and the second Bluetooth slave device, separately executing, by the Bluetooth protocol stack, a second sub-state with the first Bluetooth slave device and the second Bluetooth slave device, where the first sub-state and the second sub-state are different sub-states among the plurality of sub-states. In this solution, after separately executing the first sub-state with the first Bluetooth slave device and the second Bluetooth slave device, the Bluetooth protocol stack further sends an execution result of the first sub-state to the Bluetooth application module. In this way, the Bluetooth protocol stack of the Bluetooth master device does not need to report an execution result of a sub-state to the Bluetooth application module of the Bluetooth master device each time after completing the sub-state with a Bluetooth slave device, so that signaling overhead between the Bluetooth protocol stack of the Bluetooth master device and the Bluetooth application module of the Bluetooth master device is reduced.

In a feasible design, after the separately executing, by the Bluetooth protocol stack, a first sub-state with the first Bluetooth slave device and the second Bluetooth slave device, the method further includes: sending, by the Bluetooth protocol stack, an execution result of the first sub-state to the Bluetooth application module.

In a feasible design, the service connection includes the plurality of sub-states, and the establishing, by the Bluetooth protocol stack, a service connection with each of Bluetooth slave devices in the device combination includes: executing, by the Bluetooth protocol stack, all of the plurality of sub-states with the first Bluetooth slave device; and after the Bluetooth protocol stack executes all of the plurality of sub-states with the first Bluetooth slave device, executing, by the Bluetooth protocol stack, all of the plurality of sub-states with the second Bluetooth slave device. In this solution, after executing all sub-states of a service with a Bluetooth device, for example, a second Bluetooth device, in the device combination, the Bluetooth protocol stack of the Bluetooth master device completes all the sub-states of the service with another Bluetooth slave device. In this process, logic of establishing a service connection between the Bluetooth protocol stack of the Bluetooth master device and a single Bluetooth slave device is not changed.

In a feasible design, after the executing, by the Bluetooth protocol stack, all of the plurality of sub-states with the first Bluetooth slave device, the method further includes: sending, by the Bluetooth protocol stack, a service connection result of the first Bluetooth slave device to the Bluetooth application module. In this solution, the Bluetooth protocol stack of the Bluetooth master device does not need to report the service connection result to the Bluetooth application module of the Bluetooth master device each time after completing a service connection with a Bluetooth slave device, so that signaling overhead between the Bluetooth protocol stack of the Bluetooth master device and the Bluetooth application module of the Bluetooth master device is reduced.

In a feasible design, the establishing, by the Bluetooth protocol stack, a service connection with each of Bluetooth slave devices in the device combination includes: pairing, by the Bluetooth protocol stack, with each of Bluetooth slave devices in the device combination based on a sequence of scanned Bluetooth slave devices in the device combination. Sequential pairing between the Bluetooth master device and each of Bluetooth slave devices in the device combination is implemented.

According to a fifth aspect, an embodiment of this application further provides a computer-readable medium, configured to store a computer program or instructions. When the computer program or the instructions runs/run on an electronic device, the electronic device is enabled to perform any one of the fourth aspect or the feasible implementations of the fourth aspect.

According to a sixth aspect, an embodiment of this application provides a service connection method, including: receiving a first operation entered by a user, where the first operation is used to request to enable a Bluetooth function; displaying tag information of a scanned device combination, where the device combination includes a first Bluetooth slave device and a second Bluetooth slave device; receiving a second operation entered by the user, where the second operation is used to request a Bluetooth master device to pair with each of Bluetooth slave devices in the device combination; pairing with each of Bluetooth slave devices in the device combination; and establishing a service connection with each of Bluetooth slave devices in the device combination. In this solution, the user does not need to manually select scanned Bluetooth slave devices one by one, and the Bluetooth master device automatically pairs with each Bluetooth slave device and establishes a service connection. This is a simple process, and a speed of the service connection establishment is high.

In a feasible design, the tag information is included in a scanning result of the first Bluetooth slave device, and before the displaying tag information of a scanned device combination, the service connection method further includes: storing address information of the second Bluetooth slave device, where the address information is included in a scanning result of the second Bluetooth slave device. In this solution, the Bluetooth master device stores address information of each Bluetooth slave device, and sends, based on the address information, a pairing request to a corresponding Bluetooth slave device during subsequent pairing, so as to automatically pair with each Bluetooth slave device.

In a feasible design, the pairing with each of Bluetooth slave devices in the device combination includes: pairing with the first Bluetooth slave device; determining whether the pairing with the first Bluetooth slave device is completed; and if the pairing with the first Bluetooth slave device is completed, automatically pairing with the second Bluetooth slave device based on the address information of the second Bluetooth slave device. In this solution, the Bluetooth master device automatically pairs with the Bluetooth slave devices in the device combination.

In a feasible design, the service connection includes a plurality of sub-states, and the establishing a service connection with each of Bluetooth slave devices in the device combination includes: separately executing a first sub-state with the first Bluetooth slave device and the second Bluetooth slave device; and after separately executing the first sub-state with the first Bluetooth slave device and the second Bluetooth slave device, separately executing a second sub-state with the first Bluetooth slave device and the second Bluetooth slave device, where the first sub-state and the second sub-state are different sub-states among the plurality of sub-states. In this solution, the Bluetooth master device establishes service connections with the Bluetooth slave devices.

In a feasible design, the service connection includes a plurality of sub-states, and the establishing a service connection with each of Bluetooth slave devices in the device combination includes: executing all of the plurality of sub-states with the first Bluetooth slave device; and after executing all of the plurality of sub-states with the first Bluetooth slave device, executing all of the plurality of sub-states with the second Bluetooth slave device. In this solution, a service connection process between the Bluetooth master device and each of Bluetooth slave devices in the device combination is independently completed, and service logic establishment logic of a single Bluetooth slave device is not changed.

In a feasible design, the establishing a service connection with each of Bluetooth slave devices in the device combination includes pairing with each of Bluetooth slave devices in the device combination based on a sequence of scanned Bluetooth slave devices in the device combination. In this solution, the Bluetooth master device sequentially pairs with each of Bluetooth slave devices in the device combination.

According to the service connection establishment method, the Bluetooth master device, the chip, and the Bluetooth system provided in the embodiments of this application, after the Bluetooth master device scans the device combination including at least two Bluetooth slave devices, if the Bluetooth master device needs to establish a service connection with each of Bluetooth slave devices in the device combination, in a pairing phase, after completing pairing with one Bluetooth slave device in the device combination, the Bluetooth master device automatically performs pairing with another Bluetooth slave device in the device combination until completing pairing with each of Bluetooth slave devices in the device combination; in a service connection establishment phase, similarly, after establishing a service connection with one Bluetooth slave device in the device combination, the Bluetooth master device automatically establishes a service connection with another Bluetooth slave device in the device combination until establishing a service connection with each of Bluetooth slave devices in the device combination. In this process, the scanned Bluetooth slave devices do not need to be manually selected one by one, and the Bluetooth master device automatically pairs with each Bluetooth slave device and establishes a service connection. This is a process is simple, and a speed of service connection establishment is high.

DESCRIPTION OF EMBODIMENTS

In a Bluetooth technology, if some Bluetooth slave devices have a same attribute, the Bluetooth slave devices are classified as a device combination. For example, if a Bluetooth master device needs to share information with a plurality of Bluetooth slave devices, the plurality of Bluetooth slave devices are included in a same device combination, and there is no dependency relationship between the Bluetooth slave devices in the device combination. When the Bluetooth master device needs to establish a service connection with each of Bluetooth slave devices in the device combination, the Bluetooth master device enables a Bluetooth function, and displays each scanned Bluetooth slave device on an operation interface. Then, a user manually selects a Bluetooth slave device on an operation interface of the Bluetooth master device. Therefore, each Bluetooth slave device is paired one by one and a service connection is established. This is a complex and time-consuming operation process, and a slow service connection establishment process.

In view of this, embodiments of this application provide a service connection establishment method, a Bluetooth master device, a chip, and a Bluetooth system. A service connection between the Bluetooth master device and each of a plurality of Bluetooth slave devices is completed by using a one-click operation. This is a process is simple and a speed of the service connection is high.

In this embodiment of this application, both the Bluetooth master device and the Bluetooth slave device may be referred to as a Bluetooth device, and the Bluetooth device may be a Bluetooth mobile phone, a Bluetooth band, a Bluetooth speaker, a Bluetooth headset, a personal digital assistant (PDA) that supports a Bluetooth function, a tablet, a handheld computer, a printer, a laptop, an ultra-mobile personal computer (UMPC), a netbook, a cellular phone, a wearable device (such as a smartwatch), an augmented reality (AR) device, a virtual reality (VR) device, or the like.

Figure 1:
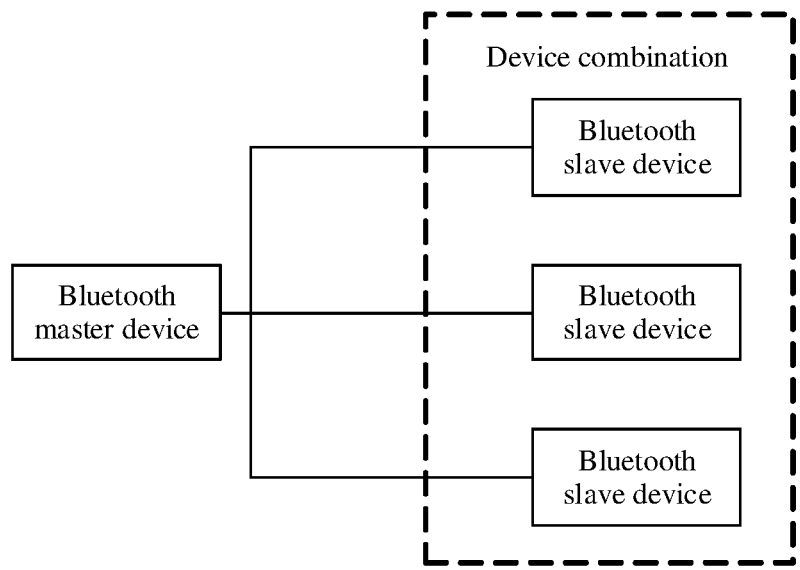
FIG. 1 is an example schematic diagram of a network architecture to which a service connection establishment method is applicable according to an embodiment of this application.
Figure 2:
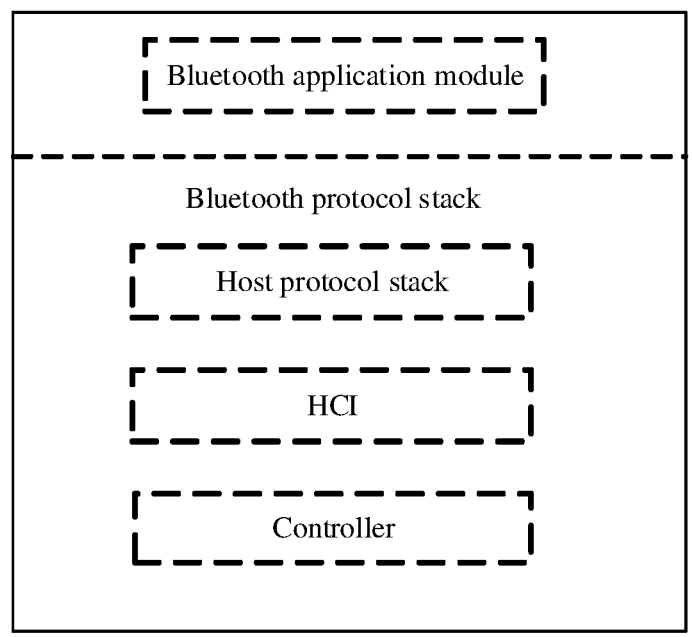
FIG. 2 is an example block diagram of a Bluetooth device according to an embodiment of this application.

FIG. 1 is a schematic diagram of a network architecture to which a service connection establishment method is applicable according to an embodiment of this application. In this network architecture, there are a Bluetooth master device and a device combination. The device combination includes at least two Bluetooth slave devices, and the Bluetooth slave devices have a same attribute. For example, all the Bluetooth slave devices are devices with which the Bluetooth master device share information. For another example, the Bluetooth master device is a mobile phone, and the Bluetooth slave device is a Bluetooth band, a Bluetooth speaker, a Bluetooth headset, a PDA, or the like, FIG. 2 is a block diagram of a Bluetooth device according to an embodiment of this application, in this embodiment of this application, the Bluetooth device includes a Bluetooth application module and a Bluetooth protocol stack. For example, the Bluetooth device is a Bluetooth master device. The Bluetooth application module of the Bluetooth master device is configured to interact with a user, convert an instruction and data that are entered by the user into application layer logic, and then invoke an application programming interface (API) provided by the Bluetooth protocol stack. Data communication and control operations between the Bluetooth master device and the Bluetooth slave device are implemented.

In this embodiment of this application, a Bluetooth framework includes but is not limited to the Bluetooth application module and the Bluetooth protocol stack. The Bluetooth protocol stack includes a host protocol stack, a host controller interface (HCI), and a controller.

The host protocol stack defines a profile and a core protocol of a plurality of applications in the Bluetooth framework, and each profile defines a corresponding message format and application rule, for example, an advanced audio distribution profile (A2DP) and a hands-free profile (HFP), so as to implement interconnection and interworking between different devices on different platforms, and meet various possible and universal application scenarios. The core protocol includes a Bluetooth module (BTM), a service discovery protocol (SDP), a logical link control and adaptation protocol (L2CAP), a radio frequency communication (RFCOMM) protocol, and the like.

The HCI provides a unified interface for the host protocol stack to enter a link manager and a unified manner to enter a baseband. There are several transport layers between a core protocol layer of the host protocol stack and the controller. These transport layers are transparent and are used to complete a data transmission task. A Bluetooth special interest group (SIG) specifies at least four physical bus manners connected to hardware, namely, at least four HCI transport layers, which are respectively a universal serial bus (USB), an RS232, a universal asynchronous receiver/transceiver (UART), and a personal computer memory card international association (PCMCA) card.

The controller defines an underlying hardware part, including a radio frequency (RF), a baseband (BB), link management (LM), and the like. The RF layer implements filtering and transmission of a data bit stream by using microwave on a 2.4 GHz unlicensed industrial scientific medical (ISM) frequency band. The RF layer mainly defines a condition that a Bluetooth transceiver needs to work normally on this frequency band. The baseband is responsible for frequency hopping and transmission of Bluetooth data and information frames. Link management is responsible for connection establishment, link teardown, and security control. Link management is implemented according to a link management layer protocol of the Bluetooth protocol stack, and is responsible, for transiting a command of an upper-layer HCI into an operation that can be received by the baseband, establishing an asynchronous connection-oriented link (ACL), a synchronous connection-oriented (SCO) link, enabling the Bluetooth device to enter a working mode of an energy-saving state, and the like. A link control (LC) layer is responsible for responding to an upload LM command during some data packet transmission, for example, executing an LM command for establishing a transmission link of a data packet or an LM command for maintaining a link.

In this embodiment of this application, a process in which the Bluetooth master device establishes a service connection with any Bluetooth slave device includes three phases: a scanning phase, a pairing phase, and a service connection establishment phase. In this embodiment of this application, for a device combination, in the scanning phase, the Bluetooth master device displays, on an operation interface, tag information of the device combination or an identifier of any Bluetooth slave device in the device combination. In the pairing phase, the Bluetooth master device is paired with a Bluetooth slave device in the device combination, and each time a pairing of a Bluetooth slave device is completed, a pairing result of the Bluetooth slave device is not reported temporarily, but the Bluetooth master device is automatically paired with a next Bluetooth slave device. A pairing result of a specific Bluetooth slave device in the device combination is reported to the Bluetooth master device after pairing with each of Bluetooth slave devices in the device combination is completed. In the service connection establishment process, the Bluetooth master device establishes a service connection with each Bluetooth slave device that is successfully paired in the device combination, and reports a service connection result to the Bluetooth master device by using the device combination as a whole.

Figure 3:
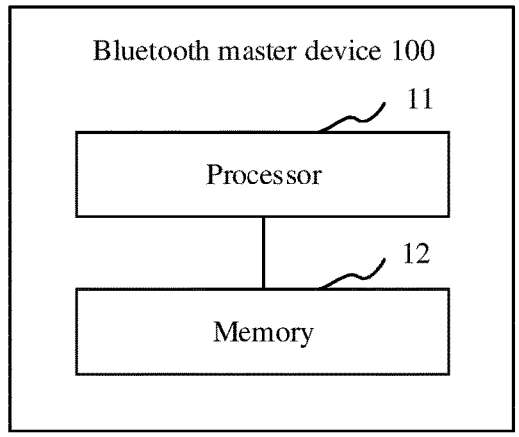
FIG. 3 is an example schematic structural diagram of a Bluetooth master device according to an embodiment of this application.
Figure 4:
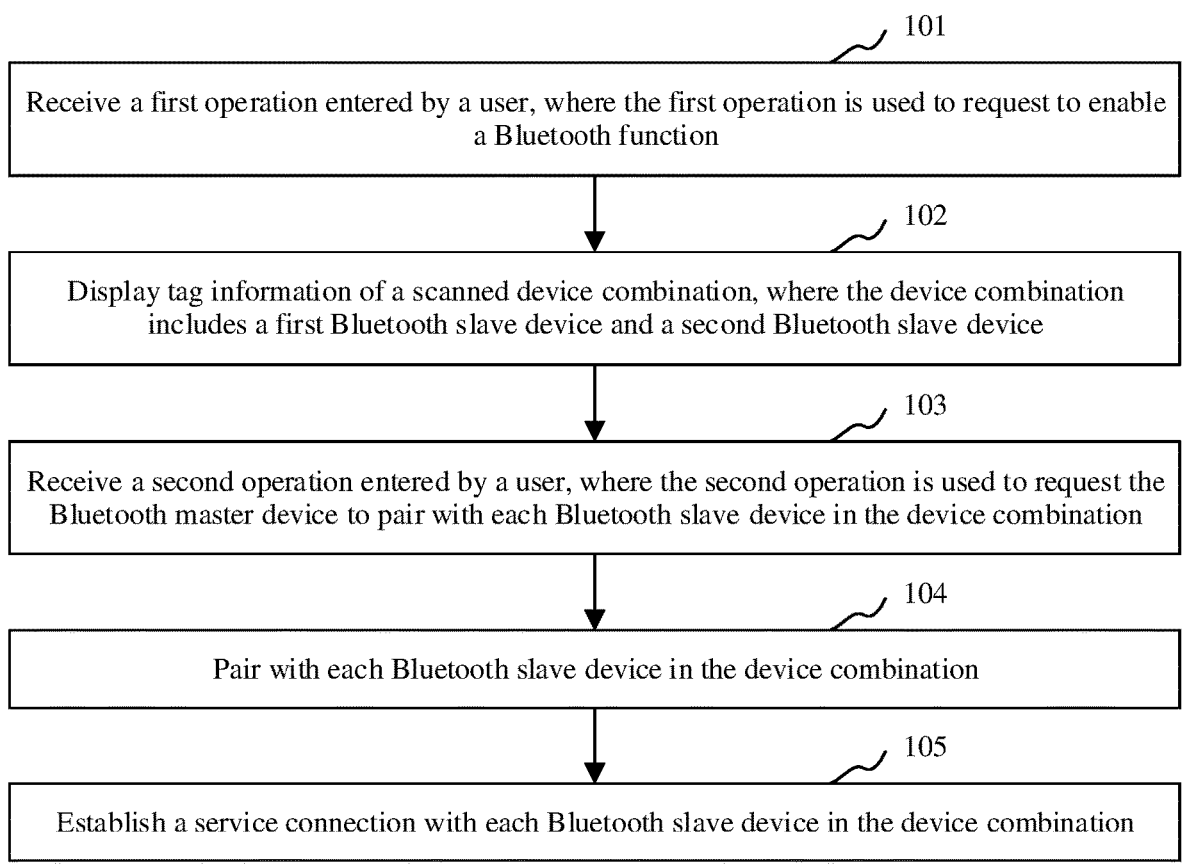
FIG. 4 is an example flowchart of a service connection establishment method according to an embodiment of this application.

The following describes in detail a service connection establishment process in the embodiments of this application based on FIG. 1 and FIG. 2. For example, for this, refer to FIG. 3 and FIG. 4. FIG. 3 is a schematic structural diagram of a Bluetooth master device according to an embodiment of this application, and FIG. 4 is a flowchart of a service connection establishment method according to an embodiment of this application. In this embodiment of this application, the Bluetooth master device 100 includes a processor 11 and a memory 12. The memory 12 stores a computer program. The computer program may be run on the processor 11. When running the computer program, the processor 11 performs steps in FIG. 4. FIG. 4 includes the following steps.

101: Receive a first operation entered by a user, where the first operation is used to request to enable a Bluetooth function.

For example, the user enters the first operation on a user interface of a Bluetooth master device, to request to enable a Bluetooth function.

102: Display tag information of a scanned device combination, where the device combination includes a first Bluetooth slave device and a second Bluetooth slave device.

For example, after the Bluetooth function of the Bluetooth master device is enabled, the Bluetooth master device actively scans surrounding Bluetooth slave devices, and displays tag information of the scanned device combination on the user interface. The device combination includes at least two Bluetooth slave devices.

For example, same tag information is written into all Bluetooth slave devices included in a same device combination. The tag information is used to tag the device combination, and may be referred to as an identifier of the device combination. Different device combinations have different tag information. For example, tag information is a name of a device combination, and there are three device combinations whose names are respectively a, b, and c. The device combination a includes a Bluetooth slave device 1 and a Bluetooth slave device 2. The device combination b includes a Bluetooth slave device 3 and a Bluetooth slave device 4. The device combination c includes a Bluetooth slave device 5 and a Bluetooth slave device 6. In this case, a is written into the Bluetooth slave device 1 and the Bluetooth slave device 2, b is written into the Bluetooth slave device 3 and the Bluetooth slave device 4, and c is written into the Bluetooth slave device 5 and the Bluetooth slave device 6. For another example, tag information is a media access control (MAC) address of a Bluetooth master device. A MAC address of a Bluetooth master device 1 is a MAC 1, a MAC address of a Bluetooth master device 2 is a MAC 2, the Bluetooth master device 1 corresponds to the device combination a, and the Bluetooth master device 2 corresponds to the device combination b. In this case, the MAC 1 is written into a non-volatile memory of each of Bluetooth slave devices in the device combination a, and the MAC 2 is written into each of Bluetooth slave devices in the device combination b. In a scanning process, the Bluetooth master device enables the Bluetooth function, scans surrounding Bluetooth slave devices, and classifies Bluetooth slave devices with same tag information into a same device combination. For Bluetooth slave devices included in a same device combination, the Bluetooth master device displays, on the interface, only tag information of the device combination corresponding to the Bluetooth slave devices. For example, for this, refer to FIG. 5A to FIG. 8B.

Figure 5A:
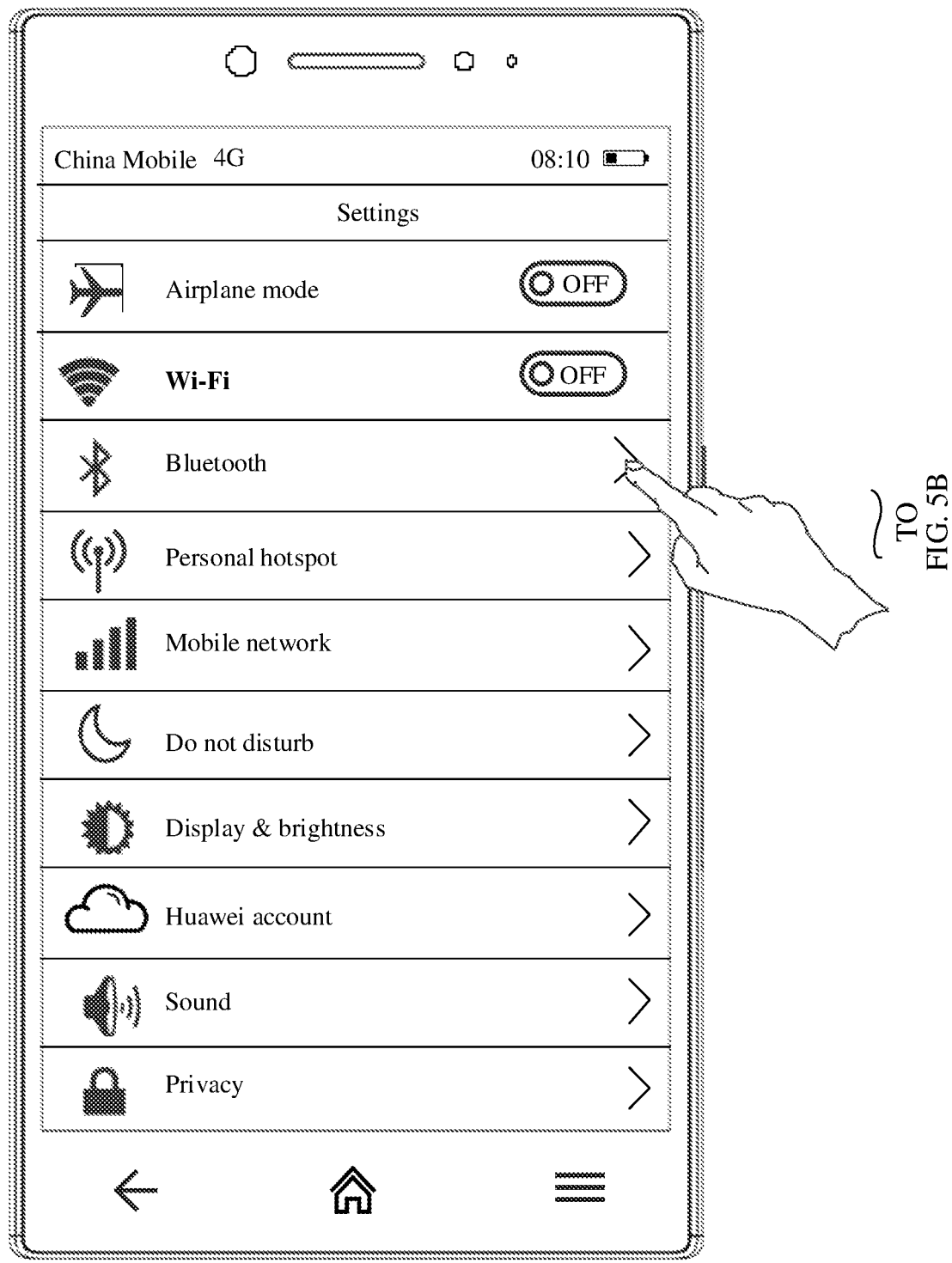
FIG. 5A and FIG. 5B each are example schematic diagrams of an interface on which a Bluetooth master device displays a device combination according to an embodiment of this application.
Figure 5B:
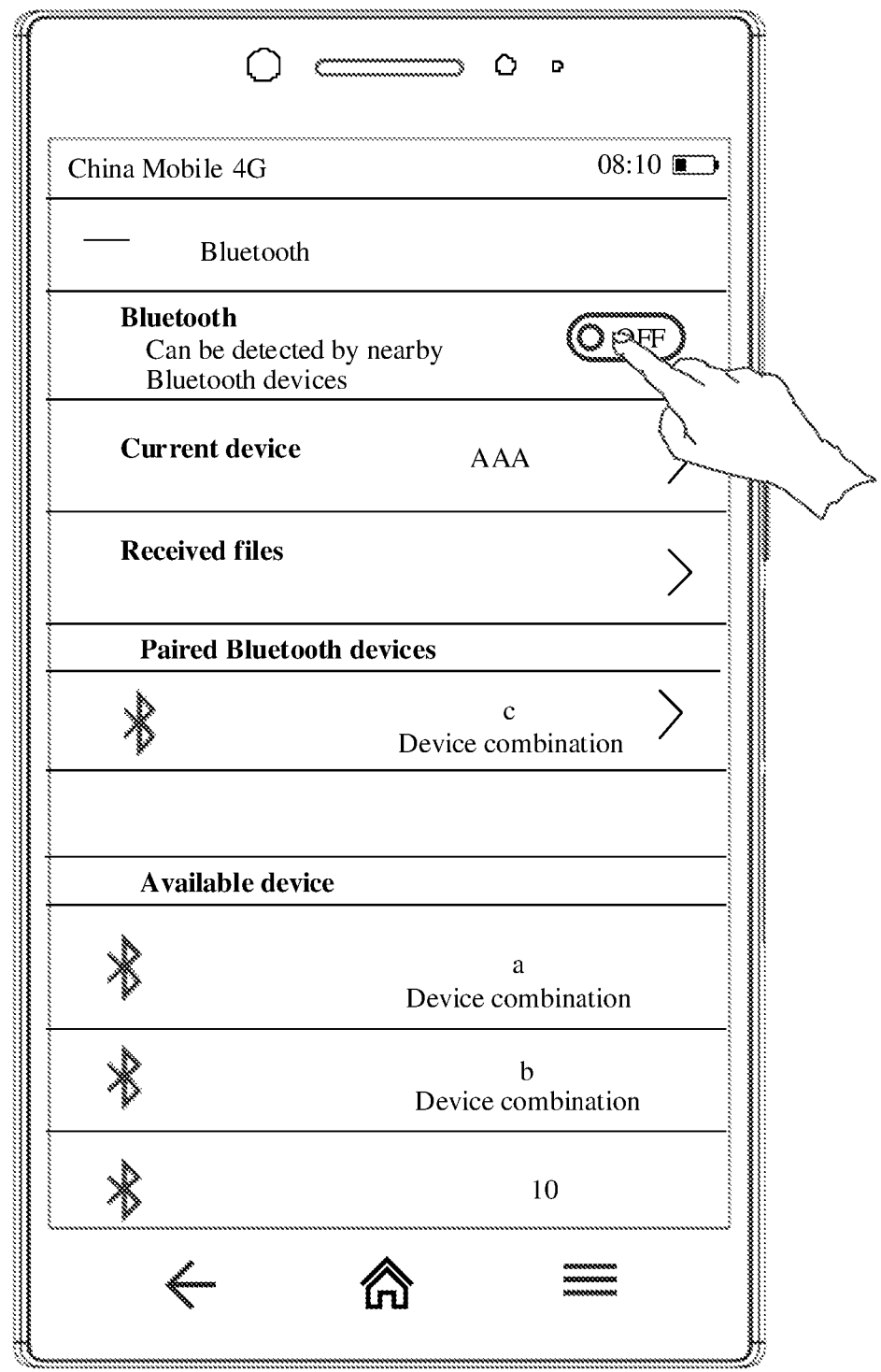

FIG. 5A and FIG. 5B each are a schematic diagram of an interface on which a Bluetooth master device displays a device combination according to an embodiment of this application. The Bluetooth master device is a Bluetooth mobile phone AAA, and the Bluetooth slave device 5 in the Bluetooth combination c has been successfully paired with the Bluetooth mobile phone AAA before this scanning. Therefore, after the Bluetooth mobile phone AAA performs this scanning, and scans the Bluetooth device combination c, the name "c" of the device combination c is displayed in a "Paired device" column of an operation interface, and "Device combination" directly below "c" or in another position is displayed, to prompt the user that "c" represents a device combination. Both the Bluetooth slave devices in the Bluetooth combination a and the Bluetooth combination b are Bluetooth slave devices that are scanned by the Bluetooth master device AAA for the first time. Therefore, identifiers of the device combination a and the device combination b are displayed in an "Available device" column of the operation interface of the Bluetooth master device AAA. In other words, "a" and "b" are displayed, and "Device combination" is displayed directly below "a" and "b" respectively, to prompt that "a" and "b" each are a device combination. The Bluetooth device 10 is an independent Bluetooth device, has not been paired with the Bluetooth mobile phone AAA, and is not included in any device combination. Therefore, the Bluetooth mobile phone AAA displays an identifier of the Bluetooth device 10 in the "Available devices" column, that is, displays "10".

In the foregoing display manner, by default, the Bluetooth master AAA scans all Bluetooth slave devices in a Bluetooth combination, and if at least one Bluetooth slave device in a device combination is not scanned, the Bluetooth master AAA does not display the device combination. The device combination a is used as an example. If the device combination a further includes a Bluetooth slave device 7 in addition to the Bluetooth slave device 1 and the Bluetooth slave device 2, when the Bluetooth master device scans the Bluetooth slave device 1 and the Bluetooth slave device 2, but does not scan the Bluetooth slave device 7, the identifier of device combination a is not displayed in the "Available device" column on the operation interface of the Bluetooth mobile phone AAA.

Figure 6A:
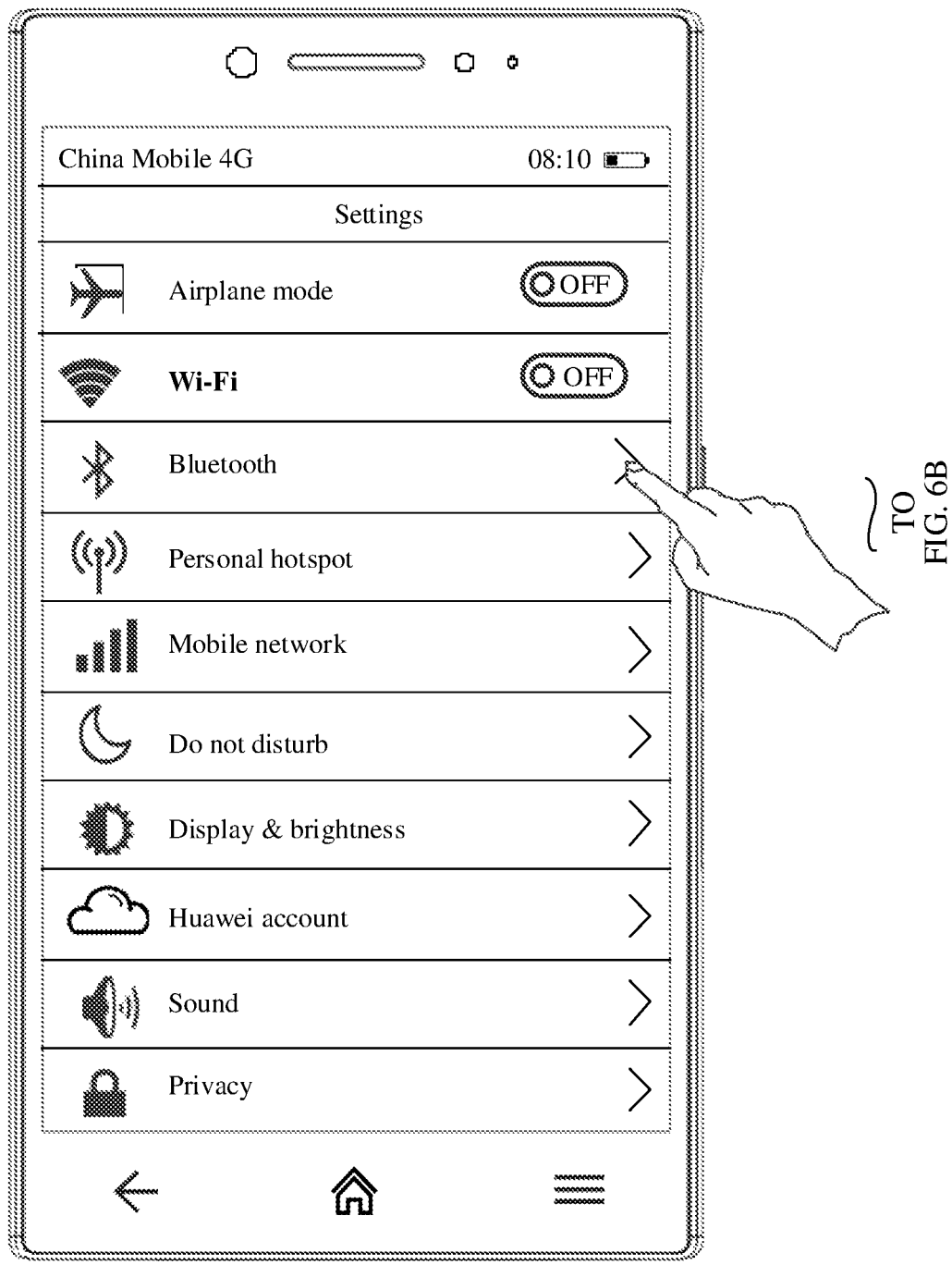
FIG. 6A and FIG. 6B each are another example schematic diagrams of art interface on which a Bluetooth master device displays a device combination according to an embodiment of this application.
Figure 6B:
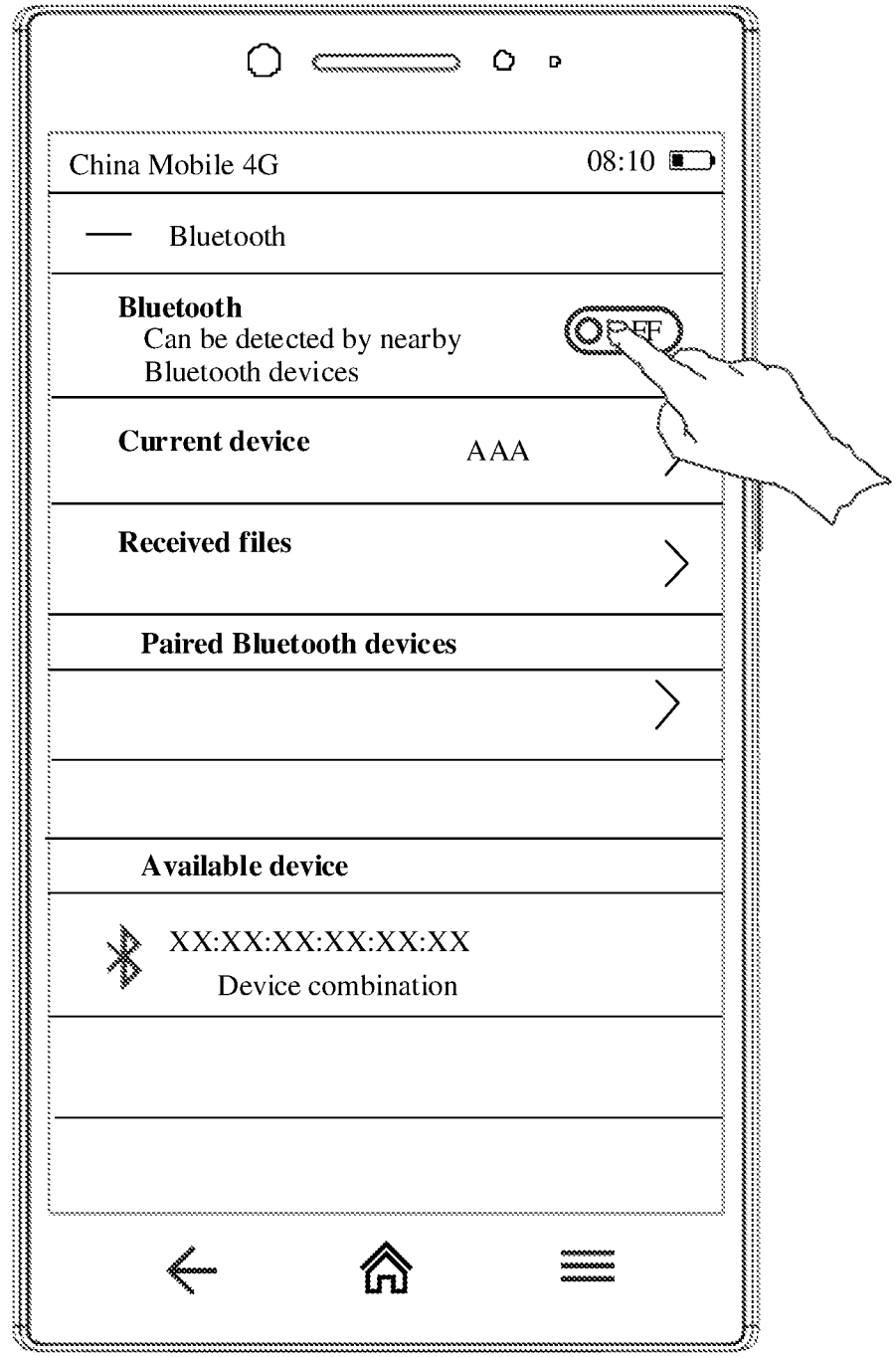

FIG. 6A and FIG. 6B each are another schematic diagram of an interface on which a Bluetooth master device displays a device combination according to an embodiment of this application. Refer to FIG. 6A and FIG. 6B. In this embodiment, tag information of the device combination is a MAC address of the Bluetooth mobile phone AAA. If a MAC address of the Bluetooth mobile phone AAA is XX:XX:XX:XX:XX:XX, and the MAC address is written into each of Bluetooth slave devices in a device combination, the MAC address is displayed on the operation interface of the Bluetooth mobile phone AAA in a scanning process, and "Device combination" is displayed directly below the MAC address, to prompt the user that "XX:XX:XX:XX:XX:XX" indicates the device combination.

In the embodiments shown in FIG. 5A, FIG. 5B, FIG. 6A, and FIG. 6B, "Device combination" is displayed below the tag information, so as to prompt the user of the device combination. However, this embodiment of this application is not limited. In another feasible implementation, the device combination may be prompted to the user in another manner.

Figure 7A:
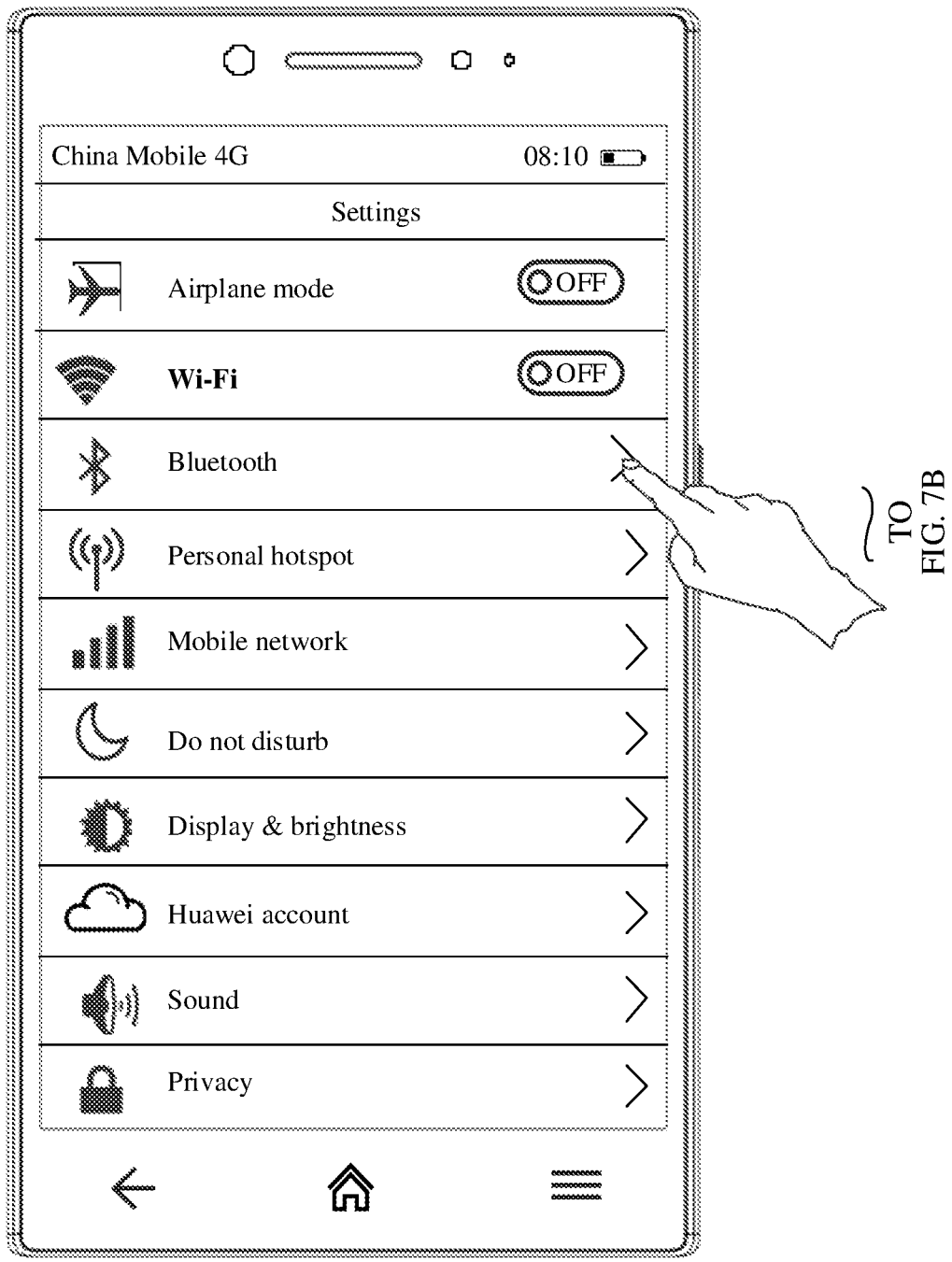
FIG. 7A and FIG. 7B each are example schematic diagrams of an interface on which a Bluetooth master device displays a device combination according to an embodiment of this application.
Figure 7B:
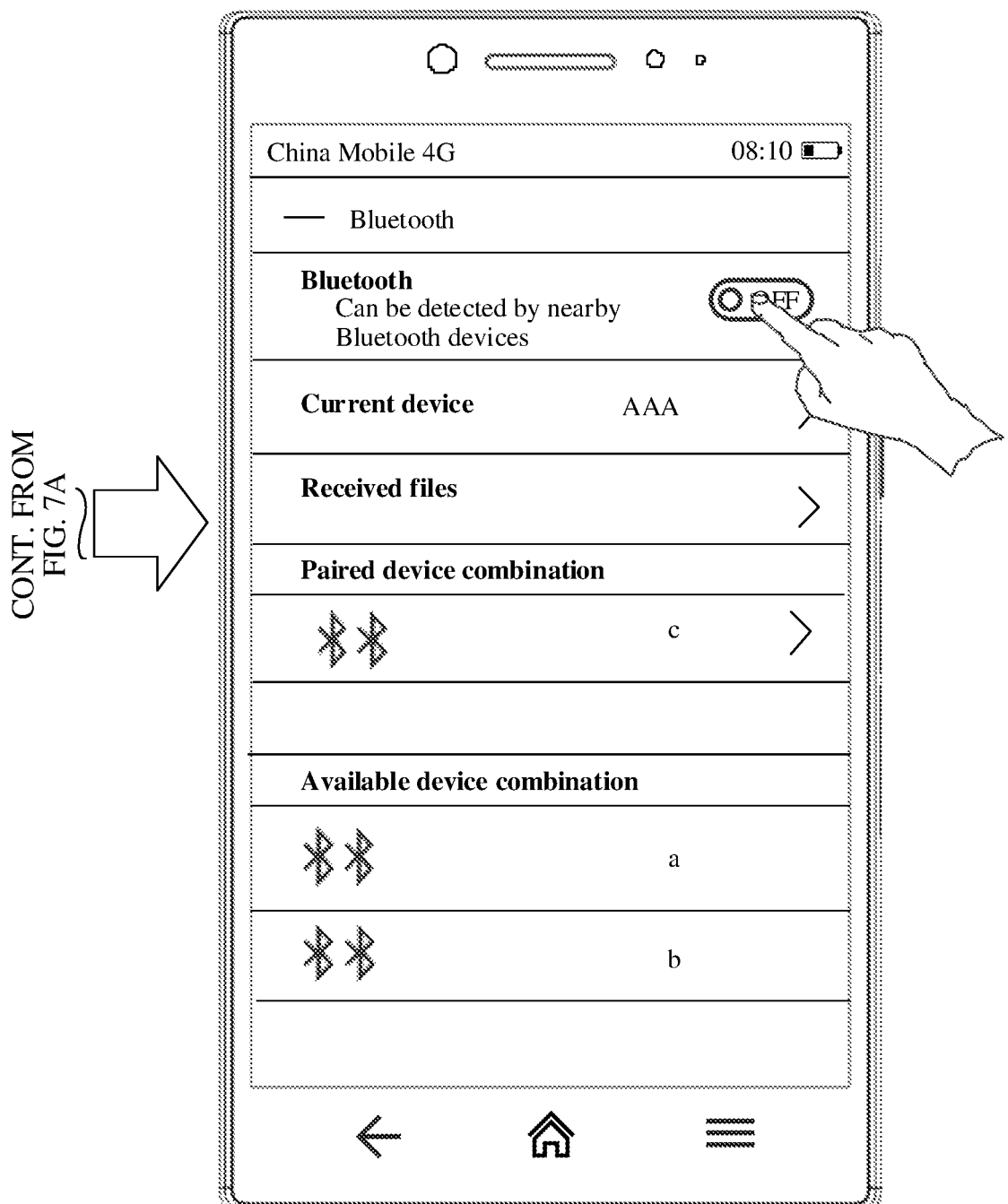

FIG. 7A and FIG. 7B each are a schematic diagram of an interface on which a Bluetooth master device displays a device combination according to an embodiment of this application. The Bluetooth master device is a Bluetooth mobile phone AAA, and a Bluetooth slave device in a Bluetooth combination c has been successfully paired with the Bluetooth mobile phone AAA before this scanning. Therefore, after the Bluetooth mobile phone AAA performs this scanning, and after the Bluetooth device combination c is scanned, an identifier "c" of the device combination c is displayed in a "Paired device combination" column of the operation interface. Both Bluetooth slave devices in a Bluetooth combination a and a Bluetooth combination h are Bluetooth slave devices scanned by the Bluetooth master device AAA for the first time. Therefore, identifiers of the device combination a and the device combination b are displayed in an "Available device combination" column of the operation interface of the Bluetooth master device AAA. In other words, "a" and "b" are displayed. In the display manner, by default, the Bluetooth master AAA scans all Bluetooth slave devices in a Bluetooth combination, and if at least one Bluetooth slave device in a device combination is not scanned, the Bluetooth master AAA also displays the device combination. The device combination a is used as an example. If the device combination a further includes a Bluetooth slave device 7 in addition to the Bluetooth slave device 1 and the Bluetooth slave device 2, when the Bluetooth master device scans the Bluetooth slave device 1 and the Bluetooth slave device 2, but does not scan the Bluetooth slave device 7, the identifier of device combination a is still displayed in the "Available device combination" column on the operation interface of the Bluetooth mobile phone AAA. Certainly, it may also be agreed that if at least one Bluetooth slave device in a device combination is not scanned, the Bluetooth master device AAA does not display the device combination.

Figure 8A:
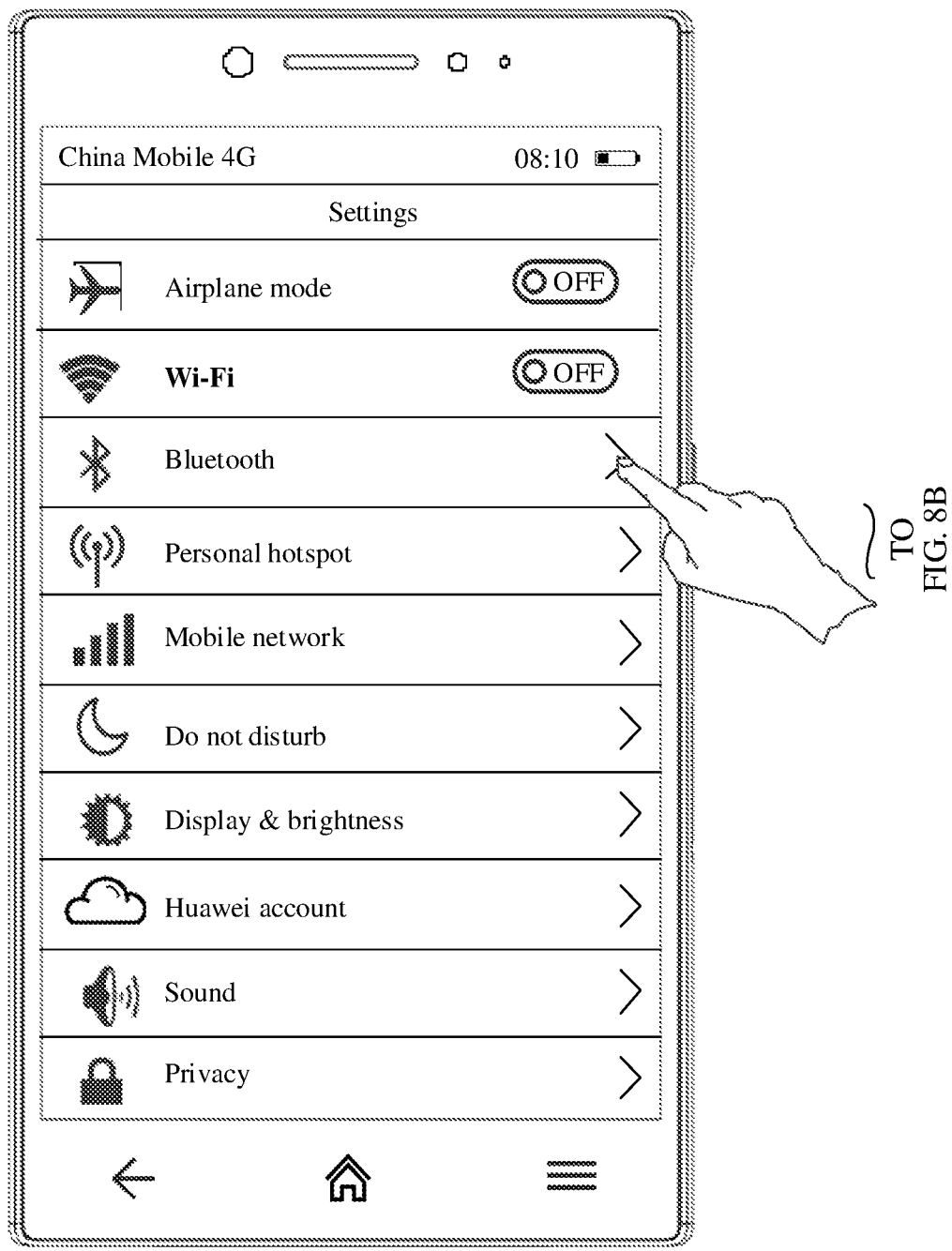
FIG. 8A and FIG. 8B each are another example schematic diagrams of an interface on which a Bluetooth master device displays a device combination according to an embodiment of this application.
Figure 8B:
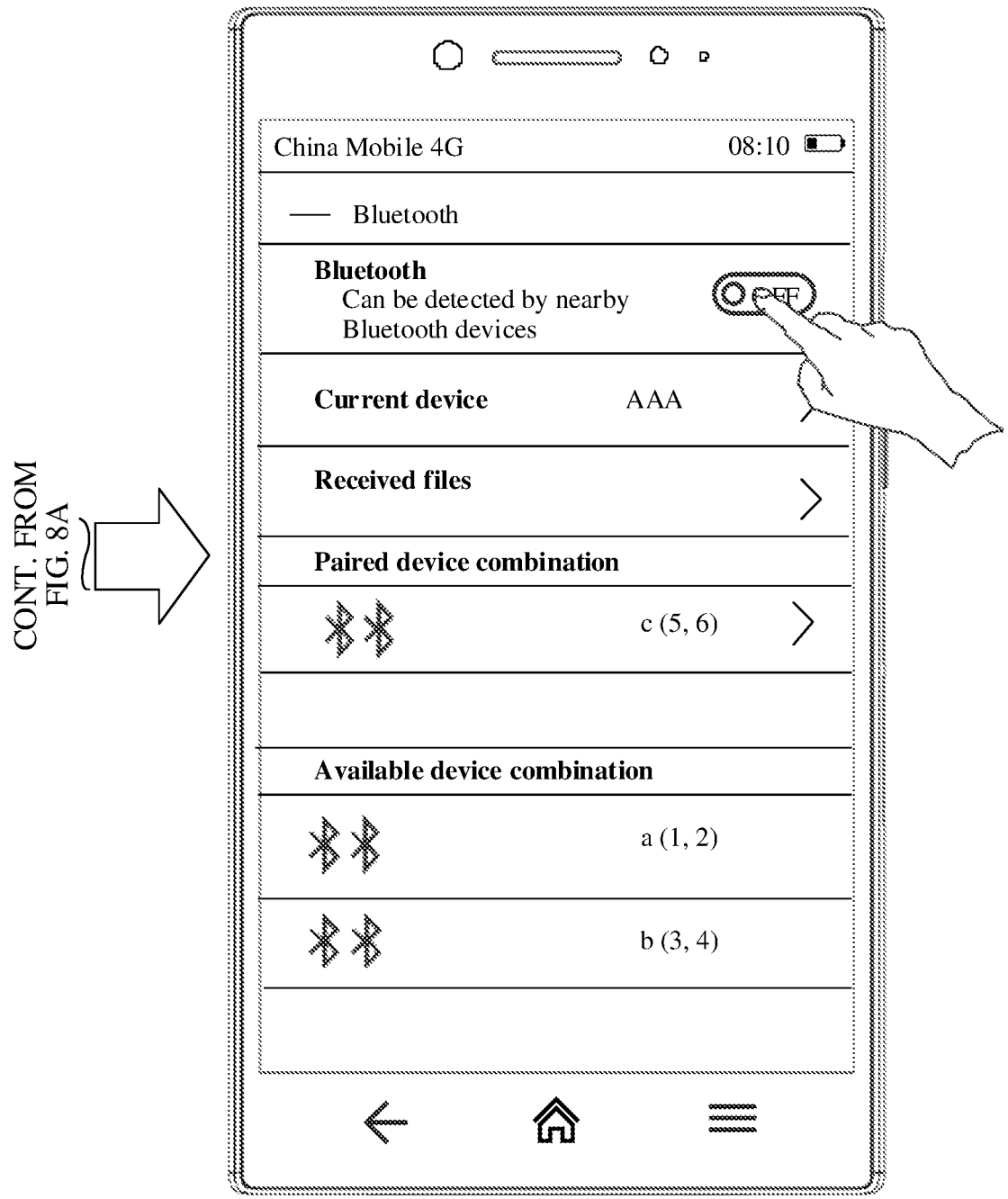

FIG. 8A and FIG. 8B each are another schematic diagram of an interface on which a Bluetooth master device displays a device combination in a service connection establishment method according to an embodiment of this application. Compared with FIG. 7A and FIG. 7B, in this embodiment, in addition to displaying an identifier of a device combination, the Bluetooth master device further displays identifiers of slave devices included in the device combination. For example, if the device combination a includes the Bluetooth slave device 1 and the Bluetooth slave device 2, the Bluetooth mobile phone AAA displays, in addition to an identifier "a" of the device combination, an identifier "1" of the Bluetooth slave device 1 and an identifier "2" of the Bluetooth slave device 2. In this case, as long as the Bluetooth master AAA scans any Bluetooth slave device in the Bluetooth device combination, the identifier of the device combination and the identifier of the Bluetooth slave device are displayed on the operation interface.

Figure 9A:
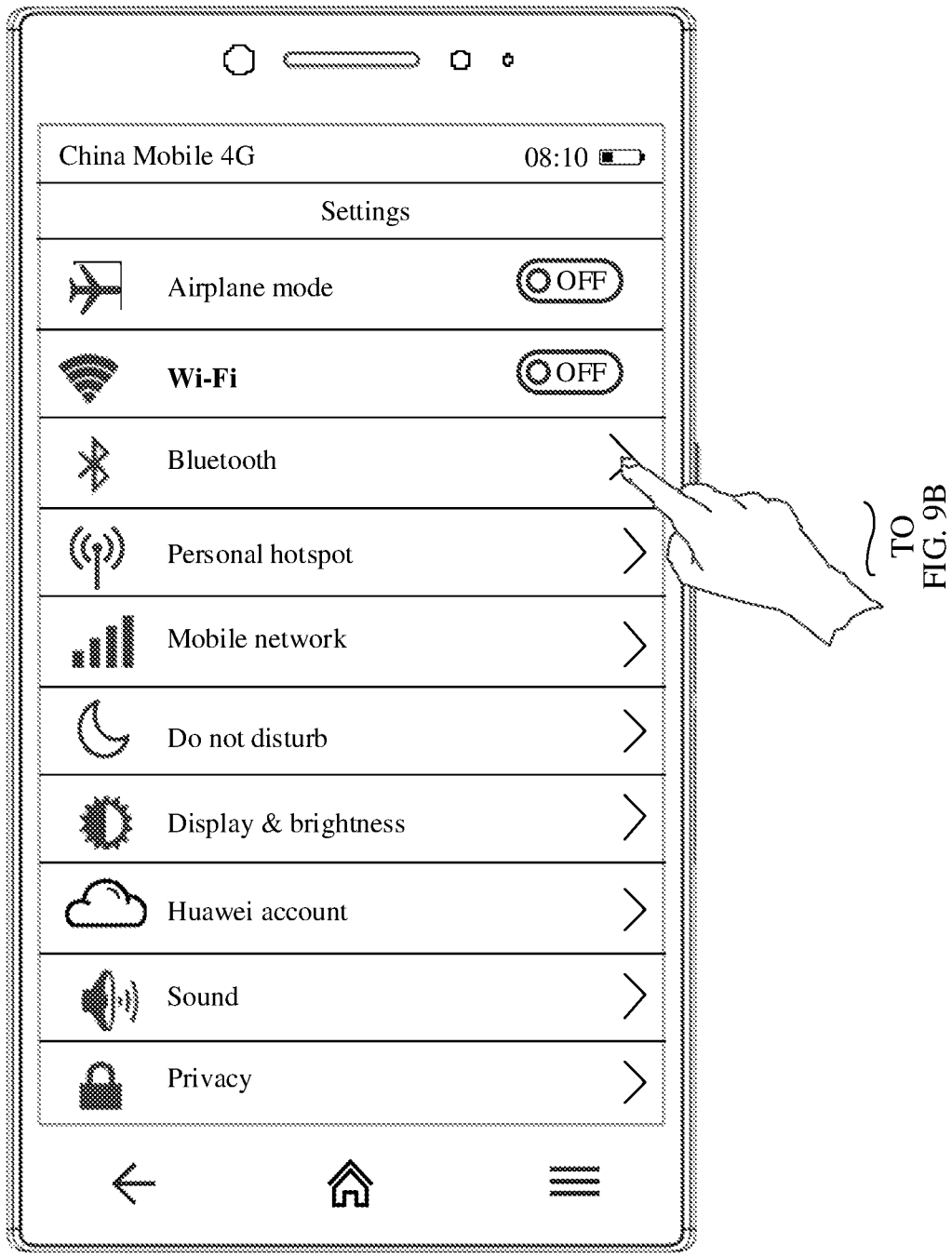
FIG. 9A and FIG. 9B each are still another example schematic diagrams of an interface on which a Bluetooth master device displays a device combination according to an embodiment of this application.
Figure 9B:
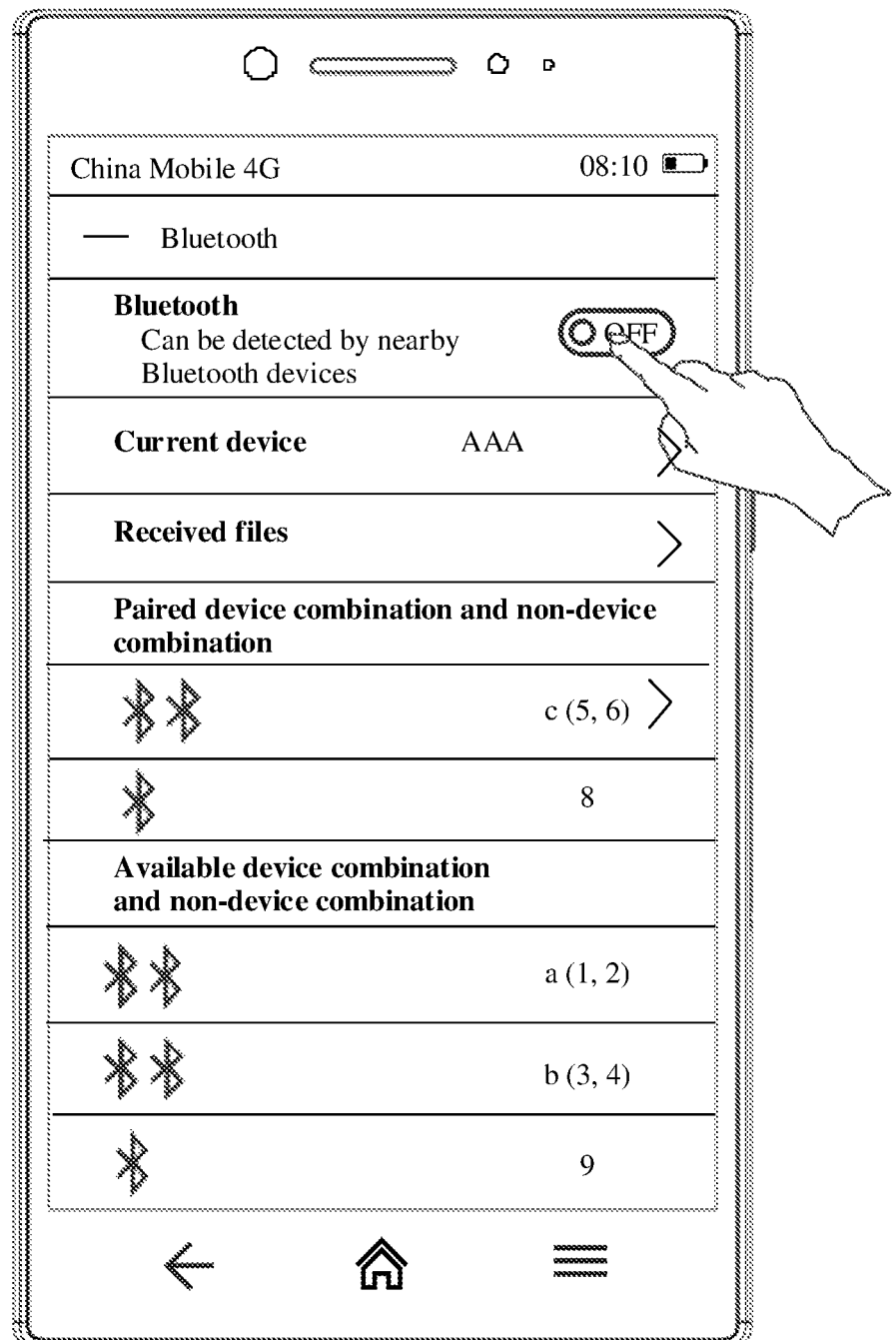

FIG. 9A and FIG. 9B each are still another schematic diagram of an interface on which a Bluetooth master device displays a device combination according to an embodiment of this application. Compared with FIG. 7A, FIG. 7B, FIG. 8A, and FIG. 8B, in this embodiment, when both a device combination and a non-device combination exist near the Bluetooth master device AAA, after Bluetooth scanning is performed, the device combination and the non-device combination are displayed on an operation interface of the Bluetooth master device AAA at the same time. The non-device combination means that the Bluetooth slave device is not included in any device combination. As shown in FIG. 9A and FIG. 9B, a Bluetooth slave device 8 is a Bluetooth slave device that has been paired with the Bluetooth master device AAA before this scanning, and a Bluetooth slave device 9 is a Bluetooth slave device scanned by the Bluetooth master device AAA for the first time.

It should be noted that, in FIG. 7A to FIG. 9B, to be separated from existing Bluetooth scanning, two Bluetooth icons " ⁑ " displayed on the operation interface of the Bluetooth master device indicates a device combination. However, this is not limited in this embodiment of this application. In another feasible implementation, other manners may alternatively be used to distinguish the existing Bluetooth scanning from the Bluetooth scanning in the embodiments of this application.

Figure 10:
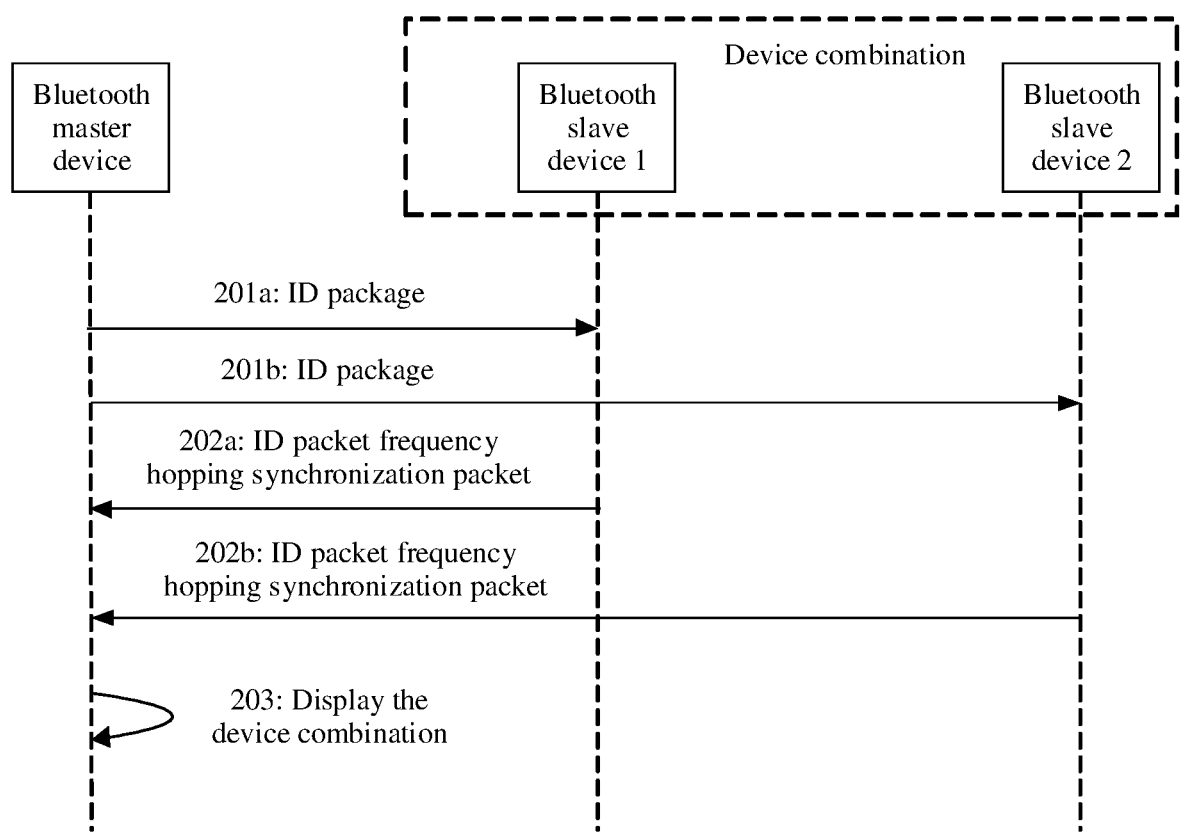
FIG. 10 is an example schematic diagram of an example of a scanning process in a service connection establishment method according to an embodiment of this application.

In this embodiment of this application, a scanning phase is also referred to as an inquiry phase. In the inquiry stage, after a Bluetooth function is enabled on the Bluetooth master device, the Bluetooth master device may query the Bluetooth device combination. That the Bluetooth function of the Bluetooth master device is enabled may be that a user turns on a Bluetooth switch on a setting interface of the Bluetooth master device, so that the Bluetooth function of the Bluetooth master device is enabled; or may be that a timer may be set in the Bluetooth master device, and after a preset time point is reached, the Bluetooth master device automatically enables the Bluetooth function. This is not limited in this embodiment of this application. FIG. 10 is a schematic diagram of an example of a scanning process in a service connection establishment method according to an embodiment of this application. A device combination includes a Bluetooth slave device 1 and a Bluetooth slave device 2. After the Bluetooth function of the Bluetooth master device is enabled, if both the Bluetooth slave device 1 and the Bluetooth slave device 2 are in an inquiry scan state, the scanning phase includes:

201a: The Bluetooth master device sends an ID packet to the Bluetooth slave device 1.

201b: The Bluetooth master device sends an ID packet to the Bluetooth slave device 2.

For example, the Bluetooth master device sends the identity (identity, ID) packet to surrounding Bluetooth slave devices in an inquiry process of a Bluetooth protocol. The ID packet carries parameter information of the Bluetooth master device, such as an identity, a media access control (Media Access Control, MAC) address, an IP address, or another parameter used to represent a capability of a terminal device.

It should be noted that because a distance between the Bluetooth master device and the Bluetooth slave device 1 is different from a distance between the Bluetooth master device and the Bluetooth slave device 2, and capabilities of receiving signals of the Bluetooth slave devices are different, this embodiment of this application does not limit a sequence of sending the ID packet to the Bluetooth slave device 1 or the Bluetooth slave device 2 by the Bluetooth master device. In other words, there is no strict sequence in step 201a and step 201b.

202a: The Bluetooth slave device 1 sends a frequency hopping synchronization packet to the Bluetooth master device.

202*b*: The Bluetooth slave device 2 sends a frequency hopping synchronization packet to the Bluetooth master device.

For example, when the Bluetooth slave device 1 and the Bluetooth slave device 2 are in the inquiry scan state, the Bluetooth slave device 1 and the Bluetooth slave device 2 may correspondingly send a frequency hopping synchronization (HFS) packet for the ID packet. The HFS packet carries tag information of the device combination in which the Bluetooth slave device is included, and the like. The tag information of the device combination is, for example, a name of the device combination or a MAC address of the Bluetooth master device. Because the Bluetooth slave device 1 and the Bluetooth slave device 2 are included in a same device combination, the Bluetooth master device displays only one combined name on the operation interface.

103: Receive a second operation entered by a user, where the second operation is used to request the Bluetooth master device to pair with each of Bluetooth slave devices in the device combination.

For example, after scanning is completed, the scanned device combination and the like are displayed on the user interface of the Bluetooth master device. The user selects a device combination that needs to be paired, so as to request pairing with each of Bluetooth slave devices in the device combination.

104: Pair with each of Bluetooth slave devices in the device combination.

For example, in a pairing phase, after the user taps an available device combination on the operation interface of the Bluetooth master device, the Bluetooth master device is triggered to pair with each of Bluetooth slave devices in the device combination. A pairing sequence may be random, or pairing may be performed according to a preset rule. This is not limited in this embodiment of this application. For example, in the scanning phase, the Bluetooth master device records a sequence of scanned Bluetooth slave devices in a device combination, and pairs with each of Bluetooth slave devices in the device combination based on the sequence. For another example, the Bluetooth master device randomly selects a Bluetooth slave device from the Bluetooth slave devices for pairing, and continues to randomly select another Bluetooth slave device after the pairing is complete, until all the Bluetooth slave devices are paired.

105: Establish a service connection with each of Bluetooth slave devices in the device combination.

For example, after completing pairing with each of Bluetooth slave devices in a device combination, the Bluetooth master device automatically establishes the service connection with each of Bluetooth slave devices in the device combination. A sequence of establishing the service connections to the Bluetooth slave devices by the Bluetooth master device is random, or the service connections may be established according to a preset rule. This is not limited in this embodiment of this application. For example, in the scanning phase, the Bluetooth master device records a sequence of scanned Bluetooth slave devices in a device combination, and in the pairing process, the Bluetooth master device performs pairing with each of Bluetooth slave devices in the device combination based on the sequence. For another example, the Bluetooth slave device randomly selects a Bluetooth slave device from the Bluetooth slave devices and establishes a service connection, and then continues to randomly select another Bluetooth slave device until the service connections are established with all the Bluetooth slave devices.

According to the service connection establishment method provided in this embodiment of this application, after the Bluetooth master device scans the device combination including at least two Bluetooth slave devices, if the Bluetooth master device needs to establish a service connection with each of Bluetooth slave devices in the device combination, in a pairing phase, after completing pairing with one Bluetooth slave device in the device combination, the Bluetooth master device automatically performs pairing with another Bluetooth slave device in the device combination until completing pairing with each of Bluetooth slave devices in the device combination; in a service connection establishment phase, similarly, after establishing a service connection with one Bluetooth slave device in the device combination, the Bluetooth master device automatically establishes a service connection with another Bluetooth slave device in the device combination until establishing a service connection with each of Bluetooth slave devices in the device combination. In this process, the scanned Bluetooth slave devices do not need to be manually selected one by one, and the Bluetooth master device automatically pairs with each Bluetooth slave device and establishes a service connection. This is a process is simple, and a speed of the service connection establishment is high.

In the foregoing embodiment, for the paired device combination, for example, paired device combination c in FIG. 5A to FIG. 9B, there are two cases:

Case 1: Each of Bluetooth slave devices in the device combination has been successfully paired with the Bluetooth master device, and after the pairing succeeds, none of the Bluetooth slave devices in the device combination has been paired with another Bluetooth master device. In this case, based on a Bluetooth connection back technology, as long as the current Bluetooth master device scans the device combination, the Bluetooth master device successfully pairs with each of Bluetooth slave devices in the device combination by default, and a service connection is successfully established. Therefore, a pairing process and a service connection establishment process do not need to be performed again.

Case 2: Each of Bluetooth slave devices in the device combination has been successfully paired with the Bluetooth master device, but after the pairing succeeds, at least one Bluetooth slave device in the device combination has been paired with another Bluetooth master device. For example, in FIG. 6A to FIG. 9B, the Bluetooth slave device 5 and/or the Bluetooth slave device 6 in the device combination c have been successfully paired with the another Bluetooth master device. In this case, the Bluetooth master AAA needs to perform the service connection establishment process with the Bluetooth slave device 5 and the Bluetooth slave device 6 in the device combination c again.

Figure 11:
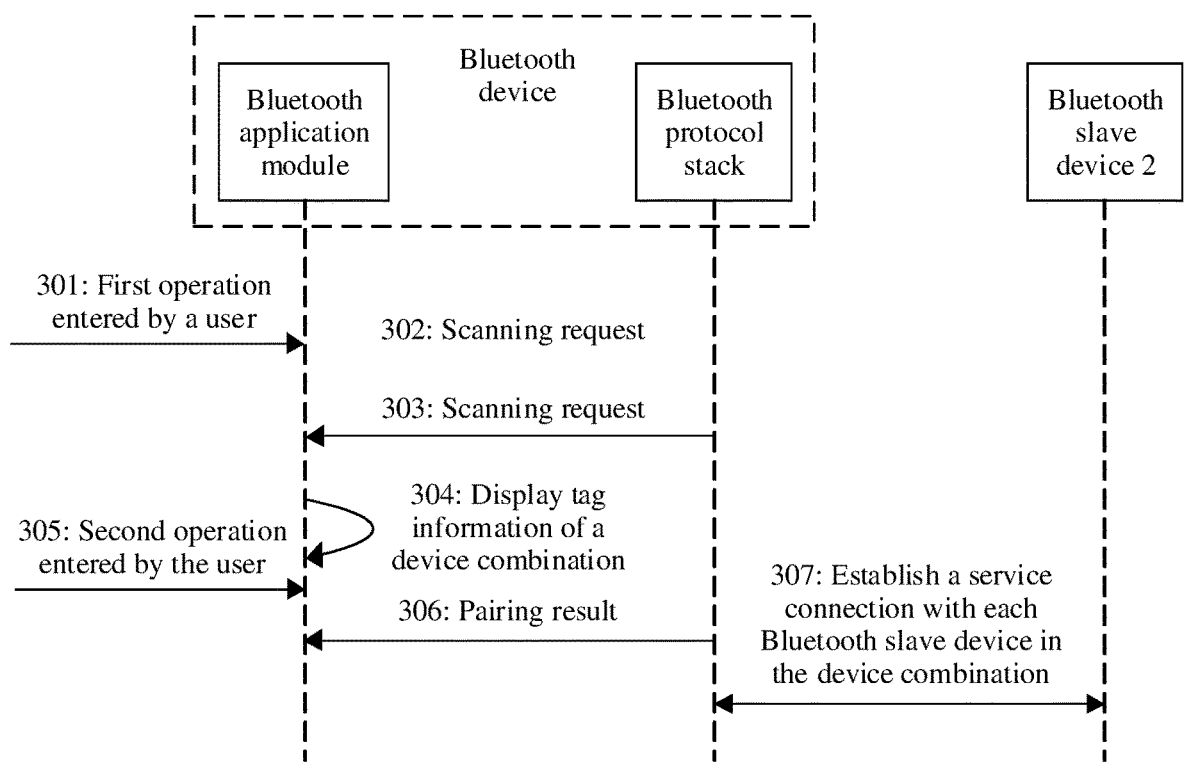
FIG. 11 is another example flowchart of a service connection establishment method according to an embodiment of this application.

FIG. 11 is a flowchart of another service connection establishment method according to an embodiment of this application. This embodiment describes in detail the service connection establishment method provided in this embodiment of this application from a perspective of interaction between a Bluetooth application module of a Bluetooth master device and a Bluetooth protocol stack. This embodiment includes the following steps.

301: A Bluetooth application module receives a first operation entered by a user, where the first operation is used to request to enable a Bluetooth function.

302: The Bluetooth application module sends a scanning request to the Bluetooth protocol stack, where the scanning request is used to request the Bluetooth protocol stack to perform Bluetooth scanning.

Correspondingly, the Bluetooth protocol stack receives the scanning request sent by the Bluetooth application module.

303: The Bluetooth protocol stack reports a scanning result to the Bluetooth application module.

The scanning result is a scanning result of any one of a first Bluetooth slave device and a second Bluetooth slave device, and the first Bluetooth slave device and the second Bluetooth slave device are included in a same device combination.

304: The Bluetooth application module controls a user interface of the Bluetooth master device to display tag information of the device combination.

The tag information of the device combination is carried in the scanning result.

305: The Bluetooth application module receives a second operation entered by the user.

The second operation is used to request the Bluetooth protocol stack to pair with each of Bluetooth slave devices in the device combination.

306: The Bluetooth application module receives a pairing result from the Bluetooth protocol stack.

The pairing result is sent after the Bluetooth protocol stack is paired with each of Bluetooth slave devices in the device combination, and the pairing result is a pairing result of any one of the first Bluetooth slave device and the second Bluetooth slave device.

307: The Bluetooth protocol stack establishes a service connection with each of Bluetooth slave devices in the device combination.

According to the service connection establishment method provided in this embodiment, after the Bluetooth master device scans the device combination including at least two Bluetooth slave devices, if the Bluetooth master device needs to establish a service connection with each of Bluetooth slave devices in the device combination, in a pairing phase, after completing pairing with one Bluetooth slave device in the device combination, the Bluetooth master device automatically performs pairing with another Bluetooth slave device in the device combination until completing pairing with each of Bluetooth slave devices in the device combination; in a service connection establishment phase, similarly, after establishing a service connection with one Bluetooth slave device in the device combination, the Bluetooth master device automatically establishes a service connection with another Bluetooth slave device in the device combination until establishing a service connection with each of Bluetooth slave devices in the device combination. In this process, the scanned Bluetooth slave devices do not need to be manually selected one by one, and the Bluetooth master device automatically pairs with each Bluetooth slave device and establishes a service connection. This is a process is simple, and a speed of the service connection establishment is high.

The following separately describes in detail a scanning phase, a pairing phase, and a service connection establishment phase in this embodiment of this application.

First, the scan phase:

In this phase, the Bluetooth application module of the Bluetooth master device sends a scanning command to the Bluetooth protocol stack of the Bluetooth master device. After receiving the scanning command, the Bluetooth protocol stack of the Bluetooth master device broadcasts an ID packet to surrounding Bluetooth devices. After the surrounding Bluetooth devices, namely, Bluetooth slave devices, receives the ID packet, automatically feed back a scanning result to the Bluetooth master device, where the scanning result is, for example, an UPS packet. In this embodiment of this application, each scanning result includes tag information, the tag information is used to distinguish a device combination, and different device combinations have different tag information. The Bluetooth protocol stack of the Bluetooth master device classifies Bluetooth slave devices corresponding to scanning results that include the same tag information into a same device combination. The following describes in detail the tag information in this embodiment of this application.

For example, the tag information is, for example, an address of the Bluetooth master device, such as a media access control address. Alternatively, the tag information may be a special symbol, and the special symbol is written into the Bluetooth master device and the Bluetooth slave device, so that after the Bluetooth protocol stack of the Bluetooth master device scans the Bluetooth slave device, the device combination in which the Bluetooth slave device is included may be determined based on the tag information included in the scanning result.

For example, the tag information may be written into the Bluetooth master device or the Bluetooth slave device in the following manners.

Manner 1: Before delivery, the tag information is written into the Bluetooth master device or the Bluetooth slave devices.

For example, the Bluetooth master device and a device combination are used as a set of devices, and the device combination includes a plurality of Bluetooth slave devices. Before delivery, tag information is written into each Bluetooth device in the set of devices. The tag information may be a MAC address of a Bluetooth slave device. For example, a MAC address of the Bluetooth slave device 1 is XX:XX:XX:XX:XX:31, a MAC address of the Bluetooth slave device 2 is XX:XX:XX:XX:XX:32, a MAC address of the Bluetooth slave device 3 is XX:XX:XX:XX:XX:33, a MAC address of the Bluetooth slave device 4 is XX: XX: XX:XX:XX:45, a MAC address of the Bluetooth slave device 5 is XX:XX:XX:XX:XX:46, a MAC address of the Bluetooth slave device 6 is XXAX:XX:XX:XX:47, and the like. If the Bluetooth master device determines, by default, that Bluetooth slave devices with consecutive MAC addresses are included in the same device combination, after scanning the Bluetooth slave device 1 to the Bluetooth slave device 6, the Bluetooth master device considers the Bluetooth slave device 1 to the Bluetooth slave device 3 as one device combination, and considers the Bluetooth slave device 4 to the Bluetooth slave device 6 as another device combination.

Manner 2: The tag information is written into the Bluetooth master device and Bluetooth slave devices in a burning manner.

For example, when one Bluetooth master device and a plurality of Bluetooth slave devices need to form a set of devices temporarily, tag information is written into the Bluetooth master device or each of Bluetooth slave devices in a burning manner. For example, the Bluetooth slave device 1, the Bluetooth slave device 2, and the Bluetooth slave device 3 need to form a device combination, and if an identifier of the device combination is a, a is written into the Bluetooth slave device 1, the Bluetooth slave device 2, and the Bluetooth slave device 3. In addition, for another example, after the tag information is written into each Bluetooth device in a set of devices in the foregoing manner, if a Bluetooth slave device needs to be added to the set of devices, the tag information is written into the additional Bluetooth slave device in the burning manner.

Manner 3: The tag information is carried in a Bluetooth low energy (BLE) broadcast.

In this manner, the tag information does not need to be written into the Bluetooth master device or the Bluetooth slave device, but the BLE broadcast of the Bluetooth slave device carries the tag information of the device combination in which the Bluetooth slave device is included. In this way, if BLE broadcasts of a plurality of Bluetooth slave devices received by the Bluetooth master device carry the same flag information, the Bluetooth master device considers that the Bluetooth slave devices are included in a same device combination.

Manner 4: The Bluetooth slave devices store the address of the Bluetooth master device.

For example, the address is a MAC address. A nonvolatile memory of each of Bluetooth slave devices in the device combination stores the MAC address of the Bluetooth master device. In a scanning phase, a scanning result obtained by the Bluetooth master device through scanning carries the MAC address. If the Bluetooth master device finds that the MAC address is the same as the MAC address of the Bluetooth master device, the Bluetooth slave device is considered to be the device combination. It should be noted that, if the tag information is the address of the Bluetooth master device, because the address is already set in the Bluetooth master device in a process of producing the Bluetooth master device, the tag information does not need to be written again.

In this embodiment, based on the tag information included in the scanned result obtained by the Bluetooth master device through scanning, the Bluetooth slave devices are divided into different device combinations, so that in a subsequent pairing phase and a service connection establishment phase, for one device combination, there is no need to manually select the scanned Bluetooth slave devices one by one. Instead, the Bluetooth master device automatically pairs with each Bluetooth slave device and establishes a service connection, so that a process is simple and a speed of the service connection establishment is high.

In the foregoing scanning phase, for the Bluetooth application module of the Bluetooth master device, each of Bluetooth slave devices in a device combination does not need to be distinguished, but all Bluetooth slave devices in the device combination are used as a whole. Therefore, the Bluetooth protocol stack of the Bluetooth master device does not need to report a scanning result of each Bluetooth slave device to the Bluetooth application module of the Bluetooth master device, but the Bluetooth protocol stack of the Bluetooth master device only needs to report a scanning result of one Bluetooth slave device. In this case, the Bluetooth protocol stack of the Bluetooth master device reports a scanning result of the first Bluetooth slave device to the Bluetooth application module of the Bluetooth master device, where the first Bluetooth slave device is any Bluetooth slave device in the device combination.

For example, the first Bluetooth device is a Bluetooth slave device scanned for the first time by the Bluetooth protocol stack of the Bluetooth master device in the device combination. In this case, after the Bluetooth protocol stack of the Bluetooth master device scans the Bluetooth slave device for the first time, the Bluetooth protocol stack of the Bluetooth master device parses a scanning result to obtain tag information, and compares the tag information with the tag information of the Bluetooth master device. If the two pieces of tag information are the same, the Bluetooth protocol stack of the Bluetooth master device reports, to the Bluetooth application module of the Bluetooth master device, the scanning result of the Bluetooth slave device that is scanned for the first time. Then, each time a Bluetooth slave device included in a same device combination is scanned, address information of the Bluetooth slave device is stored in the Bluetooth protocol stack of the Bluetooth master device, but a scanning result for the Bluetooth slave device is not reported to the Bluetooth master device.

For another example, the first Bluetooth device is any Bluetooth slave device in the device combination. In this case, each time the Bluetooth protocol stack of the Bluetooth master device scans a Bluetooth slave device, a scanning result of the Bluetooth slave device is parsed to obtain tag information, and the tag information is compared with the tag information of the Bluetooth master device. If the tag information of the Bluetooth slave device is the same as the tag information of the Bluetooth master device, the Bluetooth protocol stack of the Bluetooth master device reports, after preset duration, a scanning result of any Bluetooth slave device in the device combination to the Bluetooth application module of the Bluetooth master device.

In this embodiment, the Bluetooth protocol stack of the Bluetooth master device does not need to report a scanning result of each of Bluetooth slave devices in the device combination to the Bluetooth application module of the Bluetooth master device, but reports a scanning result of only one Bluetooth slave device in the device combination. Signaling overhead between the Bluetooth protocol stack of the Bluetooth master device and the Bluetooth application module of the Bluetooth master device is reduced.

Second, the pairing phase:

In this embodiment of this application, after the scanning phase is completed, for a device combination, the Bluetooth master device displays the tag information of the device combination to a user on an operation interface of the Bluetooth master device, and the user taps the tag information of the device combination. The Bluetooth application module of the Bluetooth master device is triggered to send a Bluetooth pairing request to the Bluetooth protocol stack of the Bluetooth master device, so as to trigger the pairing process. Alternatively, after the Bluetooth application module of the Bluetooth master device sends the scanning command to the Bluetooth protocol stack of the Bluetooth master device, the Bluetooth application module of the Bluetooth master device sends a pairing request to the Bluetooth protocol stack of the Bluetooth master device after the preset duration, to trigger the Bluetooth protocol stack of the Bluetooth master device to start the pairing process.

After the Bluetooth protocol stack of the Bluetooth master device receives the pairing request, the Bluetooth protocol stack of the Bluetooth master device pairs with the first Bluetooth slave device, and the Bluetooth protocol stack of the Bluetooth master device determines whether the pairing with the first Bluetooth slave device is completed. If the Bluetooth protocol stack of the Bluetooth master device determines that the pairing with the first Bluetooth slave device is completed, the Bluetooth protocol stack of the Bluetooth master device automatically pairs with another Bluetooth slave device in the device combination until pairing with each of Bluetooth slave devices in the device combination is completed.

For example, in the pairing process, the Bluetooth protocol stack of the Bluetooth master device sequentially sends the pairing request to each Bluetooth slave device based on an address that is of each Bluetooth slave device and that is stored in the scanning phase, and receives a pairing response sent by each Bluetooth slave device. Each time after receiving the pairing response, the Bluetooth protocol stack of the Bluetooth master device determines that the Bluetooth master device completes pairing with the Bluetooth slave device. Then, the Bluetooth protocol stack of the Bluetooth master device continues to send the pairing request to a next Bluetooth slave device, to pair with the Bluetooth slave device, until the pairing process is completed with all the Bluetooth slave devices in the device combination.

In this embodiment, in the pairing phase, the Bluetooth master device automatically completes pairing with each of Bluetooth slave devices in the device combination, without manual selection by the user, and a process is simple and a pairing speed is high.

In the foregoing pairing phase, for the Bluetooth application module of the Bluetooth master device, each of Bluetooth slave devices in a device combination does not need to be distinguished, but all Bluetooth slave devices in the device combination are used as a whole, Therefore, the Bluetooth protocol stack of the Bluetooth master device does not need to report a pairing result to the Bluetooth application module of the Bluetooth master device every time the pairing process of a Bluetooth slave device is completed, but only the Bluetooth protocol stack of the Bluetooth master device needs to report a pairing result of one Bluetooth slave device. In this case, the Bluetooth protocol stack of the Bluetooth master device determines whether the pairing with all the Bluetooth slave devices in the device combination is completed. If the Bluetooth protocol stack of the Bluetooth master device determines that the pairing with all the Bluetooth slave devices in the device combination is completed, the Bluetooth protocol stack of the Bluetooth master device sends the pairing response to the Bluetooth application module of the Bluetooth master device.

In this embodiment, the Bluetooth protocol stack of the Bluetooth master device does not need to report a pairing result of each of Bluetooth slave devices in the device combination to the Bluetooth application module of the Bluetooth master device, but reports a pairing result of only one Bluetooth slave device in the device combination. Signaling overhead between the Bluetooth protocol stack of the Bluetooth master device and the application module of the Bluetooth master device is reduced.

Finally, the service connection establishment stage:

In this embodiment of this application, after the pairing phase is completed, for a device combination, the Bluetooth master device needs to establish a service connection with each of Bluetooth slave devices in the device combination. Generally, a plurality of service connections may be established between the Bluetooth master device and one Bluetooth slave device.

In a feasible implementation, the Bluetooth protocol stack separately executes a first sub-state with the first Bluetooth slave device, and the second Bluetooth slave device, and then the Bluetooth protocol stack separately executes a second sub-state with the first Bluetooth slave device, and the second Bluetooth slave device. The first sub-state and the second sub-state are different sub-states in a plurality of sub-states.

In this implementation, after the Bluetooth protocol stack of the Bluetooth master device executes a sub-state of a service connection with all Bluetooth slave devices in the device combination, the Bluetooth master device executes another sub-state of the service connection with each Bluetooth slave device. In other words, in the service connection establishment stage, the Bluetooth protocol stack of the Bluetooth master device completes each sub-state of the service connection with each of Bluetooth slave devices in the device combination.

In addition, in this implementation, after separately executing the first sub-state with the first Bluetooth slave device and the second Bluetooth slave device, the Bluetooth protocol stack further sends an execution result of the first sub-state to the Bluetooth application module. In this way, the Bluetooth protocol stack of the Bluetooth master device does not need to report an execution result of a sub-state to the Bluetooth application module of the Bluetooth master device each time after completing the sub-state with a Bluetooth slave device, so that signaling overhead between the Bluetooth protocol stack of the Bluetooth master device and the Bluetooth application module of the Bluetooth master device is reduced.

In another feasible implementation, the service connection includes a plurality of sub-states, and when the Bluetooth protocol stack establishes a service connection with each of Bluetooth slave devices in the device combination, the Bluetooth protocol stack executes all of the plurality of sub-states with the first Bluetooth slave device. After the Bluetooth protocol stack executes all of the plurality of sub-states with the first Bluetooth slave device, the Bluetooth protocol stack executes all of the plurality of sub-states with the second Bluetooth slave device.

In this implementation, after executing all sub-states of a service with a Bluetooth device, for example, a second Bluetooth device, in the device combination, the Bluetooth protocol stack of the Bluetooth master device completes all the sub-states of the service with another Bluetooth slave device. In this process, logic of establishing a service connection between the Bluetooth protocol stack of the Bluetooth master device and a single Bluetooth slave device is not changed.

In addition, in this implementation, after executing all of the plurality of sub-states with the first Bluetooth slave device, the Bluetooth protocol stack further sends a service connection result of the first Bluetooth slave device to the Bluetooth application module. In this way, the Bluetooth protocol stack of the Bluetooth master device does not need to report an execution result of a service connection to the Bluetooth application module of the Bluetooth master device each time after completing a service connection with a Bluetooth slave device, so that signaling overhead between the Bluetooth protocol stack of the Bluetooth master device and the Bluetooth application module of the Bluetooth master device is reduced.

The following describes in detail the foregoing service connection establishment method by using two embodiments. For example, for this, refer to FIG. 12A to FIG. 14B.

Figure 12A:
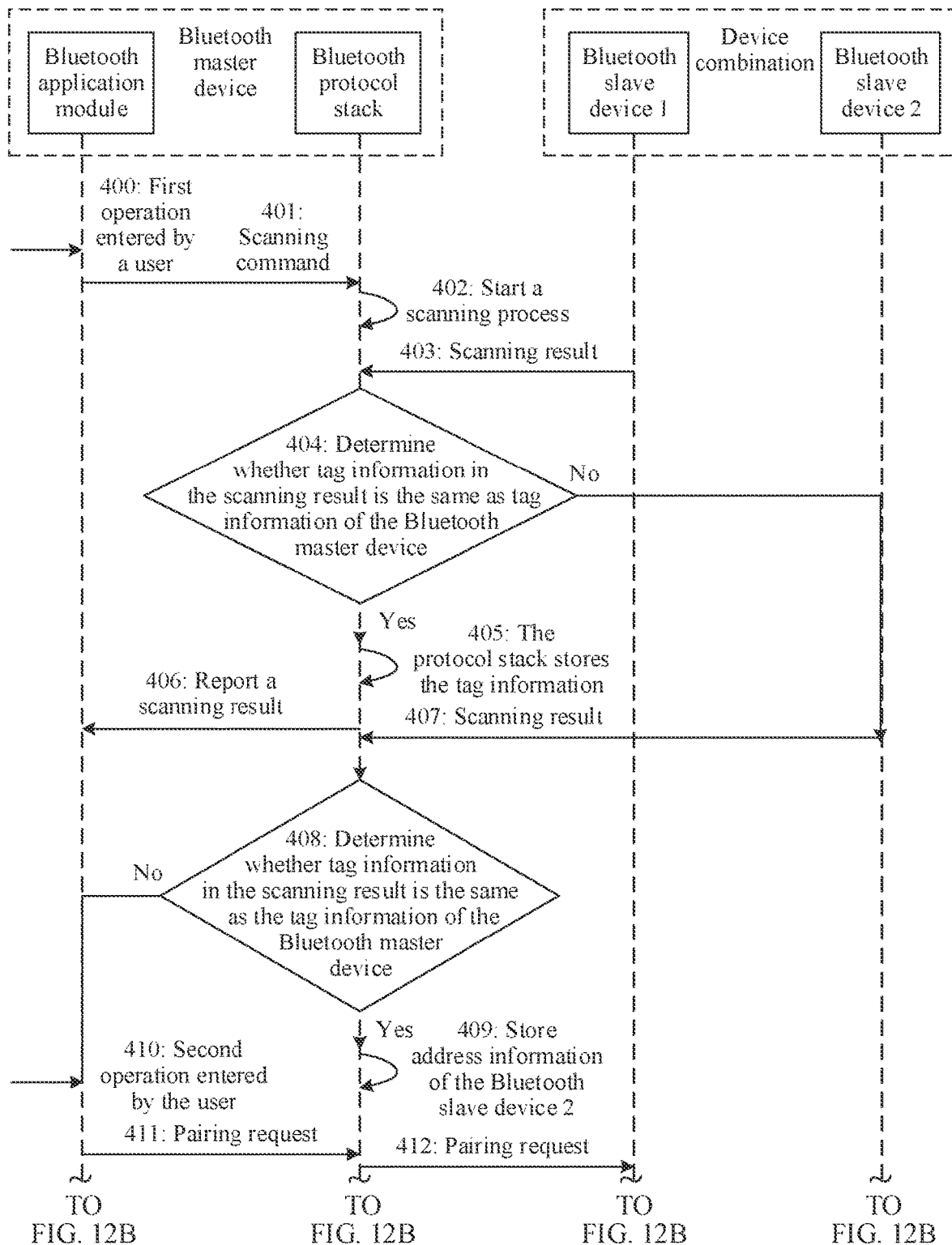
FIG. 12A, FIG. 12B, and FIG. 12C are still another example flowcharts of a service connection establishment method according to an embodiment of this application.
Figure 12B:
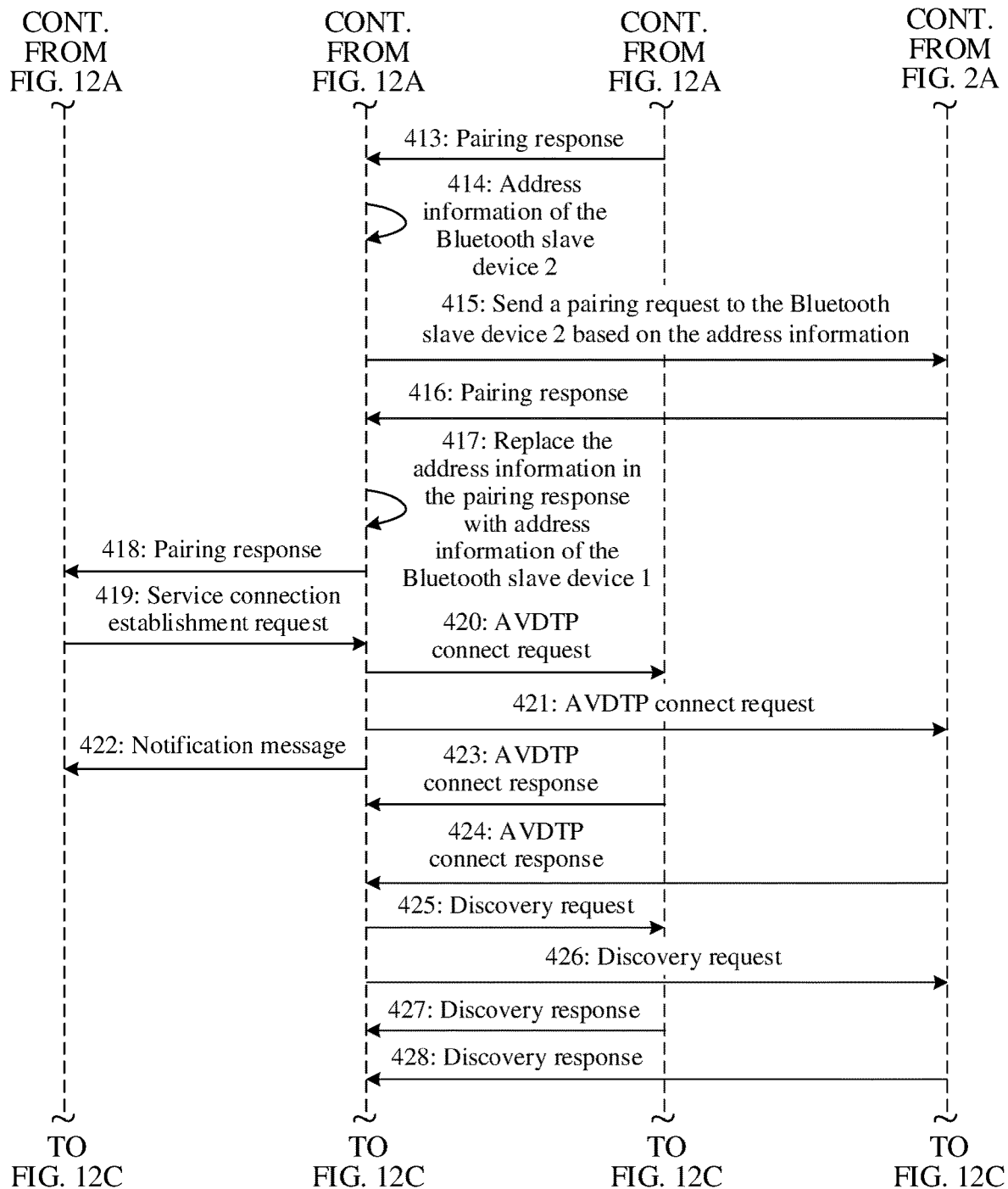
Figure 12C:
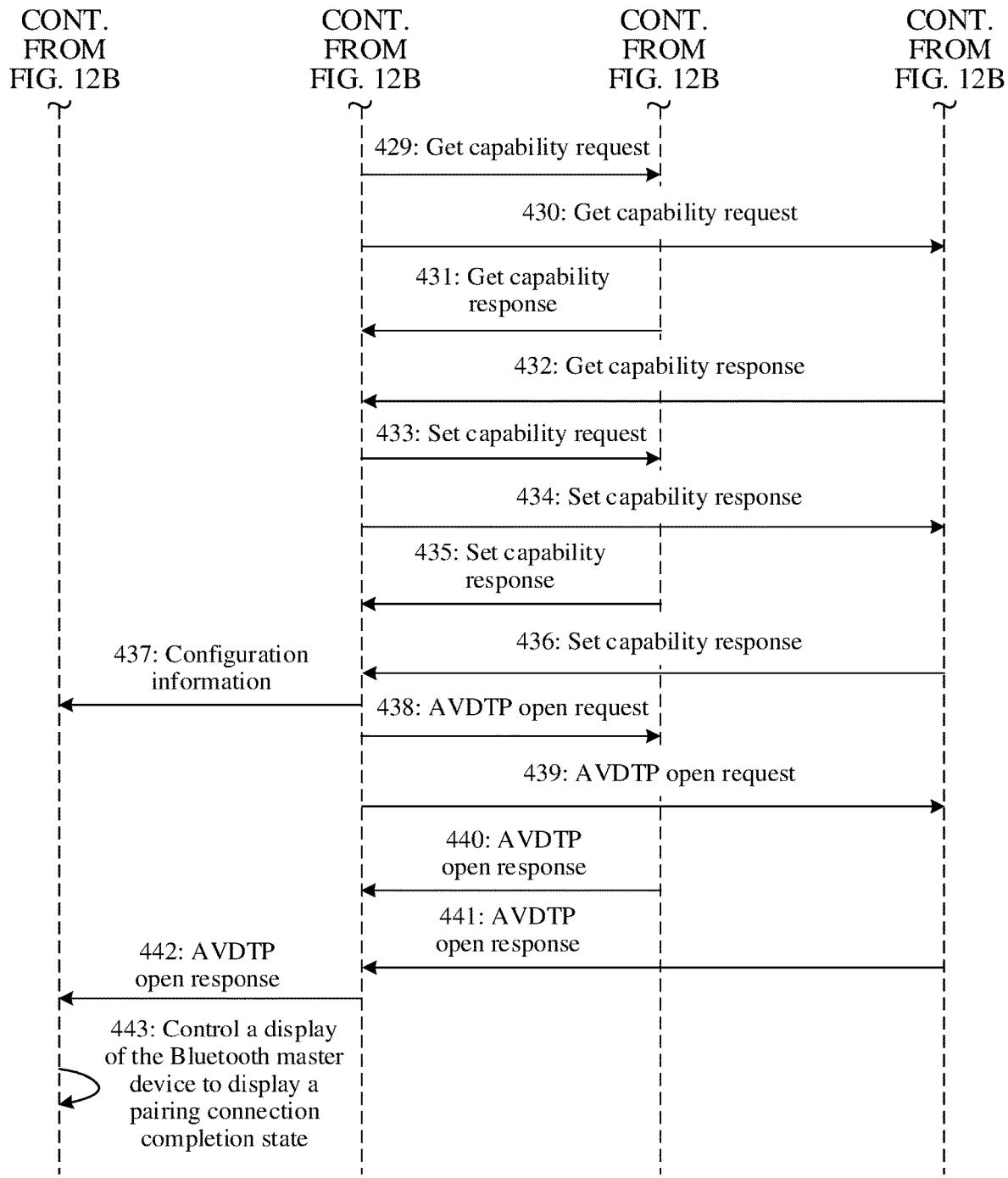

FIG. 12A, FIG. 12B, and FIG. 12C are a flowchart of still another service connection establishment method according to an embodiment of this application. In this embodiment, a device combination includes a Bluetooth slave device 1 and a Bluetooth slave device 3. In a service connection establishment phase, a Bluetooth protocol stack of a Bluetooth master device completes each sub-state of this service connection with each of Bluetooth slave devices in the device combination. This embodiment includes the following steps.

400: A Bluetooth application module receives a first operation entered by a user.

The first operation is used to request to enable a Bluetooth function.

401: The Bluetooth application module of the Bluetooth master device sends a scanning command to a Bluetooth protocol stack of the Bluetooth master device.

For example, the Bluetooth application module of the Bluetooth master device receives the first operation entered by the user, where the first operation is used to request to enable the Bluetooth function.

402: The Bluetooth protocol stack of the Bluetooth master device starts a Bluetooth scanning process.

403: The Bluetooth protocol stack of the Bluetooth master device obtains a scanning result of the Bluetooth slave device 1.

404: The Bluetooth protocol stack of the Bluetooth master device determines whether tag information in the scanning result is the same as tag information of the Bluetooth master device. If the tag information in the scanning result is the same as the tag information of the Bluetooth master device, step 405 is performed. If the tag information in the scanning result is different from the tag information of the Bluetooth master device, step 407 is performed.

For example, the scanning result may be included in an extended inquiry response (EIR) packet, a broadcast data (e.g., advertising data, AD) packet, or the like, and the EIR packet or AD packet includes tag information. The Bluetooth protocol stack of the Bluetooth master device compares the tag information in the EIR packet or the AD packet with the local tag information. If the two pieces of tag information are the same, it indicates that the Bluetooth slave device is a slave device of the Bluetooth master device, and the Bluetooth protocol stack of the Bluetooth master device performs step 405. If the two pieces of tag information are different, step 407 is performed.

405: The Bluetooth protocol stack of the Bluetooth master device stores the tag information, and performs step 406.

406: The Bluetooth protocol stack of the Bluetooth master device reports the scanning result to the Bluetooth application module of the Bluetooth master device.

407: The Bluetooth protocol stack of the Bluetooth master device obtains a scanning result of the Bluetooth slave device 2.

408: The Bluetooth protocol stack of the Bluetooth master device determines whether tag information in the scanning result is the same as the tag information of the Bluetooth master device. If the tag information in the scanning result is the same as the tag information of the Bluetooth master device, step 409 is performed. If the tag information in the scanning result is different from the tag information of the Bluetooth master device, step 410 is performed.

409: The Bluetooth protocol stack of the Bluetooth master device stores address information of the Bluetooth slave device 2.

In other words, if the tag information in the scanning result of the Bluetooth slave device 2 is the same as the tag information of the Bluetooth master device, the Bluetooth protocol stack of the Bluetooth master device stores the address information of the Bluetooth slave device 2, but does not report scanning information of the Bluetooth slave device 2 to the Bluetooth application module of the Bluetooth master device.

The foregoing steps 401 to 409 may be understood as the scanning phase.

410: The Bluetooth application module of the Bluetooth master device receives a second operation entered by the user.

The second operation is used to request the Bluetooth protocol stack to pair with each of Bluetooth slave devices in the device combination.

In this step, tag information of the device combination is displayed on a display interface of the Bluetooth master device, where the tag information is, for example, an identifier of the device combination. If there are a plurality of device combinations, an identifier of each device combination is displayed. The user selects a device combination from these identifiers.

411: The Bluetooth application module of the Bluetooth master device sends a pairing request to the Bluetooth protocol stack of the Bluetooth master device.

412: The Bluetooth protocol stack of the Bluetooth master device sends the pairing request to the Bluetooth slave device 1.

413: The Bluetooth protocol stack of the Bluetooth master device receives a pairing response of the Bluetooth slave device 1.

414: The Bluetooth protocol stack of the Bluetooth master device obtains the address information of the Bluetooth slave device 2.

415: The Bluetooth protocol stack of Bluetooth master device sends the pairing request to the Bluetooth slave device 2 based on the address information.

416: The Bluetooth protocol stack of the Bluetooth master device receivers a pairing response sent by the Bluetooth slave device 2.

417: The Bluetooth protocol stack of the Bluetooth master device replaces the address information in the pairing response with address information of the Bluetooth slave device 1.

418: The Bluetooth protocol stack of the Bluetooth master device sends the pairing response to the Bluetooth application module of the Bluetooth master device.

Based on the foregoing, it can be learned that after the Bluetooth protocol stack of the Bluetooth master device completes pairing with a Bluetooth slave device in the device combination, a pairing result of the Bluetooth slave device is not reported temporarily, but after the Bluetooth master device completes pairing with each of Bluetooth slave devices in the device combination, a pairing result of one Bluetooth slave device in the device combination is reported to the Bluetooth application nodule of the Bluetooth master device.

In the foregoing pairing process, if pairing of a Bluetooth slave device fails, the Bluetooth protocol stack of the Bluetooth master device skips the Bluetooth slave device, and starts pairing with another Bluetooth slave device in the device combination.

The foregoing steps 410 to 418 may be understood as the pairing phase.

In this embodiment of this application, one service corresponds to one service connection, one service connection includes a plurality of sub-states, and the Bluetooth protocol stack of the Bluetooth master device needs to execute the plurality of sub-states with the Bluetooth slave devices. For example, the service connection is a service connection that supports audio video distribution transport protocol (AVDTP), and the AVDTP service connection has six service state machines. For example, FIG. 13 is an example schematic diagram of a service state machine in a service connection establishment method according to an embodiment of this application.

Figure 13:
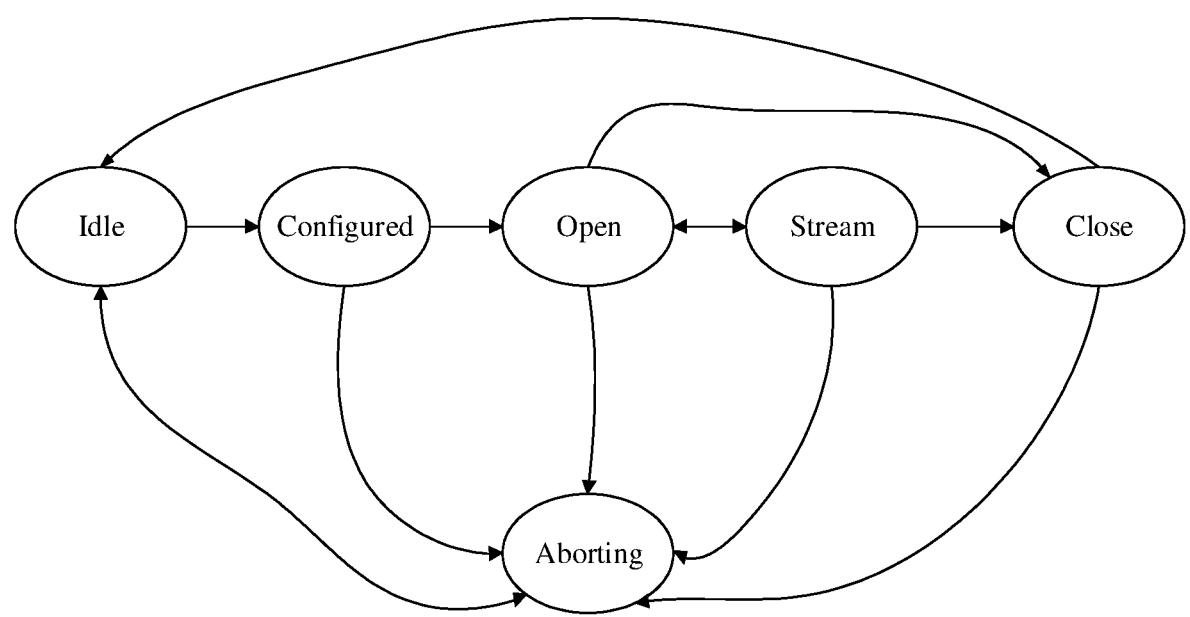
FIG. 13 is an example schematic diagram of an example of a service state machine in a service connection establishment method according to an embodiment of this application.

Refer to FIG. 13. The six service state machines of the AVDTP service connection are: idle (IDLE), configured, open, stream, close, and aborting. When the AVDTP service connection is established between the Bluetooth master device and the Bluetooth slave device, current profiles (AVDTP) of the Bluetooth master device and the Bluetooth slave device need to be switched from an idle state to an open state, and the Bluetooth protocol stack needs to sequentially perform the following steps: AVDTP connection, discovery, get capability, set capability, and open. After the "open" is completed, the AVDTP service connection is established between the Bluetooth master device and the Bluetooth slave device 1. Similarly, the Bluetooth master device also needs to perform the foregoing steps with the Bluetooth slave device 2, so as to establish the AVDTP service connection between the Bluetooth master device and the Bluetooth slave device 2. An AVDTP connection sub-state, a discovery sub-state, a get capability sub-state, a set capability sub-state, and an open sub-state may be referred to as five sub-states of the AVDTP service connection. The following describes in detail how the Bluetooth master device separately performs the foregoing steps with the Bluetooth slave device 1 and the Bluetooth slave device 2 to establish the AVDTP service connection.

419: The Bluetooth application module of the Bluetooth master device initiates a connect request to the Bluetooth protocol stack.

420: The Bluetooth protocol stack sends an AVDTP connect request to the Bluetooth slave device 1.

421: The Bluetooth protocol stack sends an AVDTP connect request to the Bluetooth slave device 2.

There is no strict sequence of steps 420 and 421. The Bluetooth protocol stack of the Bluetooth master device separately sends the AVDTP connect request to the Bluetooth slave device and the Bluetooth slave device 2.

422: The Bluetooth protocol stack reports a notification message to the Bluetooth application module.

The notification message is used to notify the Bluetooth application module that the Bluetooth protocol stack is processing the connect request in step 419.

The Bluetooth application module of the Bluetooth master device receives the notification message, and for an A2DP, a service connection of the Bluetooth application module switches from a disconnecting state to a connecting state.

423: The Bluetooth slave device 1 sends an AVDTP connect response to the Bluetooth protocol stack of the Bluetooth master device.

424: The Bluetooth slave device 2 sends an AVDTP connect response to the Bluetooth protocol stack of the Bluetooth master device.

There is no strict sequence of step 424 and step 424.

425: The Bluetooth protocol stack of the Bluetooth master device sends a discovery request to the Bluetooth slave device 1.

For example, after receiving the AVDTP connect response sent by the Bluetooth slave device 1, the Bluetooth protocol stack of the Bluetooth master device sends the discovery request (discovery request) to the Bluetooth slave device 1.

426: The Bluetooth protocol stack of the Bluetooth master device sends a discovery request to the Bluetooth slave device 2.

For example, after receiving the AVDTP connect response sent by the Bluetooth slave device 2, the Bluetooth protocol stack of the Bluetooth master device sends the discovery request to the Bluetooth slave device 2.

There is no strict sequence of step 425 and step 426.

427: The Bluetooth slave device 1 sends a discovery response to the Bluetooth protocol stack of the Bluetooth master device.

428: The Bluetooth slave device 2 sends a discovery response to the Bluetooth protocol stack of the Bluetooth master device.

There is no strict sequence of step 427 and step 428.

The foregoing steps 427 to 428 may be understood as a process in which the Bluetooth master device separately executes the discovery sub-state with the Bluetooth slave device 1 and the Bluetooth slave device 2.

429: The Bluetooth protocol stack of the Bluetooth master device sends a get capability request to the Bluetooth slave device 1.

For example, after receiving the discovery response sent by the Bluetooth slave device 1, the Bluetooth protocol stack of the Bluetooth master device sends the get capability request to the Bluetooth slave device 1.

430: The Bluetooth protocol stack of the Bluetooth master device sends a get capability request to the Bluetooth slave device 2.

For example, after receiving the discovery response sent by the Bluetooth slave device 2, the Bluetooth protocol stack of the Bluetooth master device sends the get capability request to the Bluetooth slave device 2.

There is no strict sequence of step 429 and step 430.

431: The Bluetooth slave device 1 sends a get capability response to the Bluetooth protocol stack of the Bluetooth master device.

432: The Bluetooth slave device 2 sends a get capability response to the Bluetooth protocol stack of the Bluetooth master device.

There is no strict sequence of step 431 and step 432.

The foregoing steps 429 to 432 may be understood as a process in which the Bluetooth master device separately executes the get capability sub-state with the Bluetooth slave device 1 and the Bluetooth slave device 2.

433: The Bluetooth protocol stack of the Bluetooth master device sends a set capability request to the Bluetooth slave device 1.

For example, after receiving the get capability response sent by the Bluetooth slave device 1, the Bluetooth protocol stack of the Bluetooth master device sends the set capability request to the Bluetooth slave device 1.

434: The Bluetooth protocol stack of the Bluetooth master device sends a set capability request to the Bluetooth slave device 2.

For example, after receiving the get capability response sent by the Bluetooth slave device 2, the Bluetooth protocol stack of the Bluetooth master device sends the set capability request to the Bluetooth slave device 2.

There is no strict sequence of step 433 and step 434.

435: The Bluetooth slave device 1 sends a set capability response to the Bluetooth protocol stack of the Bluetooth master device.

The set capability response carries configuration information of the Bluetooth slave device 1, and the configuration information carries an encoding parameter related to an AVDP service connection, and the like.

436: The Bluetooth slave device 2 sends a set capability response to the Bluetooth protocol stack of the Bluetooth master device.

The set capability response carries the configuration information of the Bluetooth slave device 1.

There is no strict sequence of step 435 and step 436.

In the foregoing steps 423 to 436, for each Bluetooth slave device, after receiving a response from the Bluetooth slave device, the Bluetooth protocol stack of the Bluetooth master device does not need to focus on a status of another Bluetooth slave device, but directly sends a next request to the Bluetooth slave device. The response includes an AVDTP connect response, a discovery response, a get capability response, a set capability response, and the like, and the request includes a discovery request, a get capability request, a set capability request, and the like.

437: The Bluetooth protocol stack of the Bluetooth master device reports configuration information to the Bluetooth application module of the Bluetooth master device.

The foregoing steps 433 to 437 may be understood as a process in which the Bluetooth master device separately executes the set capability sub-state, with the Bluetooth slave device 1 and the Bluetooth slave device 2. After the Bluetooth protocol stack of the Bluetooth master device first receives the configuration information of the Bluetooth slave device, for example, the configuration information of the Bluetooth slave device 1, the Bluetooth protocol stack of the Bluetooth master device does not report the configuration information to the Bluetooth application module temporarily, but after each Bluetooth slave device reports the configuration information to the Bluetooth application module, reports configuration information of any Bluetooth slave device to the Bluetooth application module.

438: The Bluetooth protocol stack of the Bluetooth master device sends an AVDTP open request to the Bluetooth slave device 1.

For example, after receiving the get capability response sent by the Bluetooth slave device 1, the Bluetooth protocol stack of the Bluetooth master device sends the AVDTP open request to the Bluetooth slave device 1.

439: The Bluetooth protocol stack of the Bluetooth master device sends an AVDTP open request to the Bluetooth slave device 2.

For example, after receiving the yet capability response sent by the Bluetooth slave device 2, the Bluetooth protocol stack of the Bluetooth master device sends the AVDTP open request to the Bluetooth slave device 2.

There is no strict sequence of step 438 and step 439.

440: The Bluetooth slave device 1 sends an AVDTP open response to the Bluetooth protocol stack of the Bluetooth master device.

441: The Bluetooth slave device 2 sends an AVDTP open response to the Bluetooth protocol stack of the Bluetooth master device.

There is no strict sequence of step 440 and step 441.

442: The Bluetooth protocol stack of the Bluetooth master device reports the AVDTP open response to the Bluetooth application module of the Bluetooth master device.

The foregoing steps 438 to 442 may be understood as a process in which the Bluetooth master device separately executes the set open sub-state for the Bluetooth slave device 1 and the Bluetooth slave device 2. After the Bluetooth protocol stack of the Bluetooth master device first receives the AVDTP open response of the Bluetooth slave device, for example, the AVDTP open response of the Bluetooth slave device 1, the Bluetooth protocol stack of the Bluetooth master device does not report the AVDTP open response to the Bluetooth application module temporarily, but after each Bluetooth slave device reports the AVDTP open response to the Bluetooth application module, reports an AVDTP open response of any Bluetooth slave device to the Bluetooth application module.

In addition, if there are a plurality of services between the Bluetooth master device and the Bluetooth slave device, a service connection establishment process of another service is similar.

The foregoing steps 419 to 442 may be understood as a service connection establishment process.

443: The Bluetooth application module of the Bluetooth master device controls a display of the Bluetooth master device to display a pairing connection completion state.

In this embodiment, the Bluetooth protocol stack of the Bluetooth master device classifies, based on the tag information, Bluetooth slave devices whose scanning results carry the same tag information as a device combination. In this embodiment, in the service connection establishment stage, the Bluetooth protocol stack of the Bluetooth master device completes each sub-state of a service with each Bluetooth slave device.

Figure 14A:
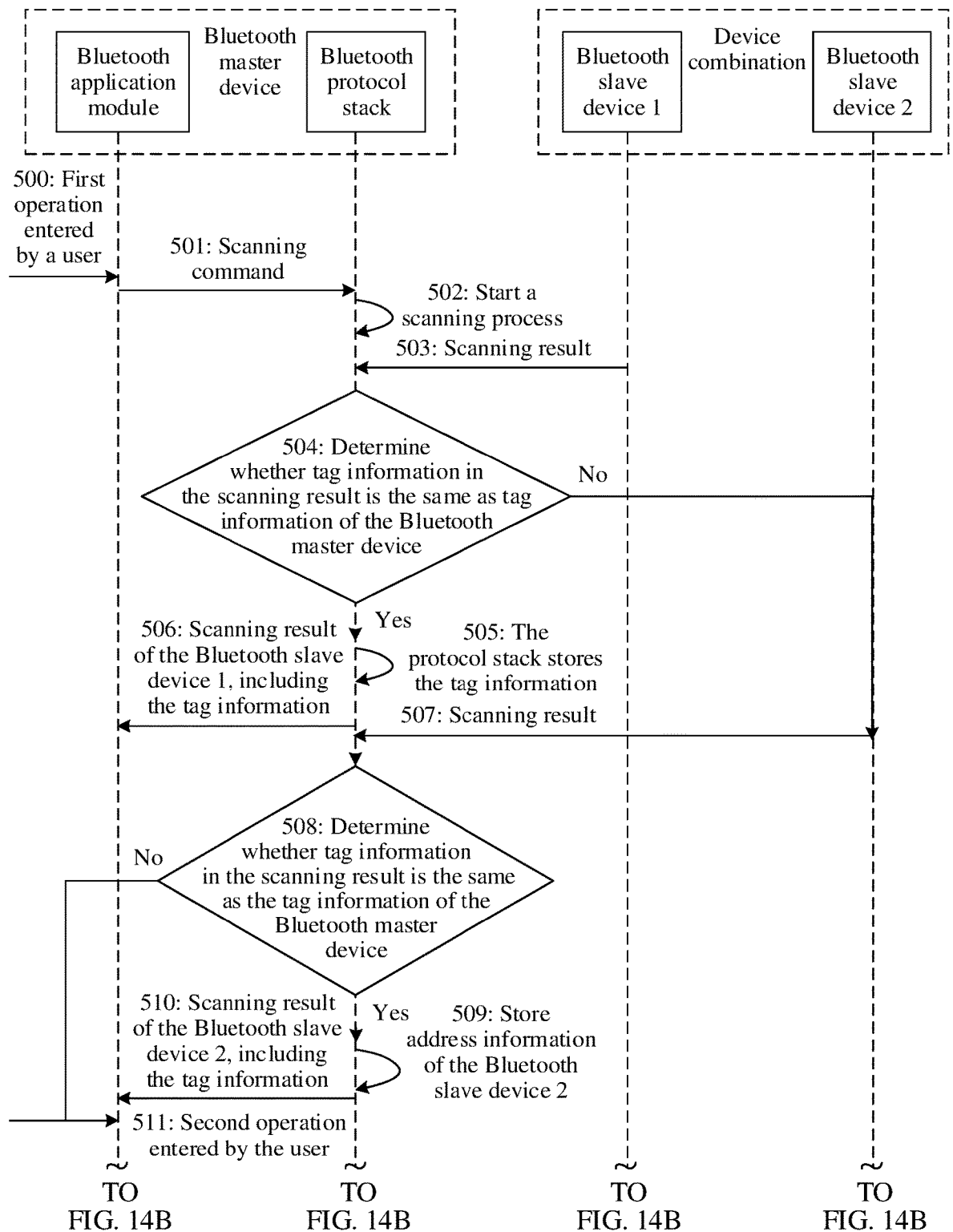
FIG. 14A and FIG. 14B are another example flowchart of a service connection establishment method according to an embodiment of this application.
Figure 14B:
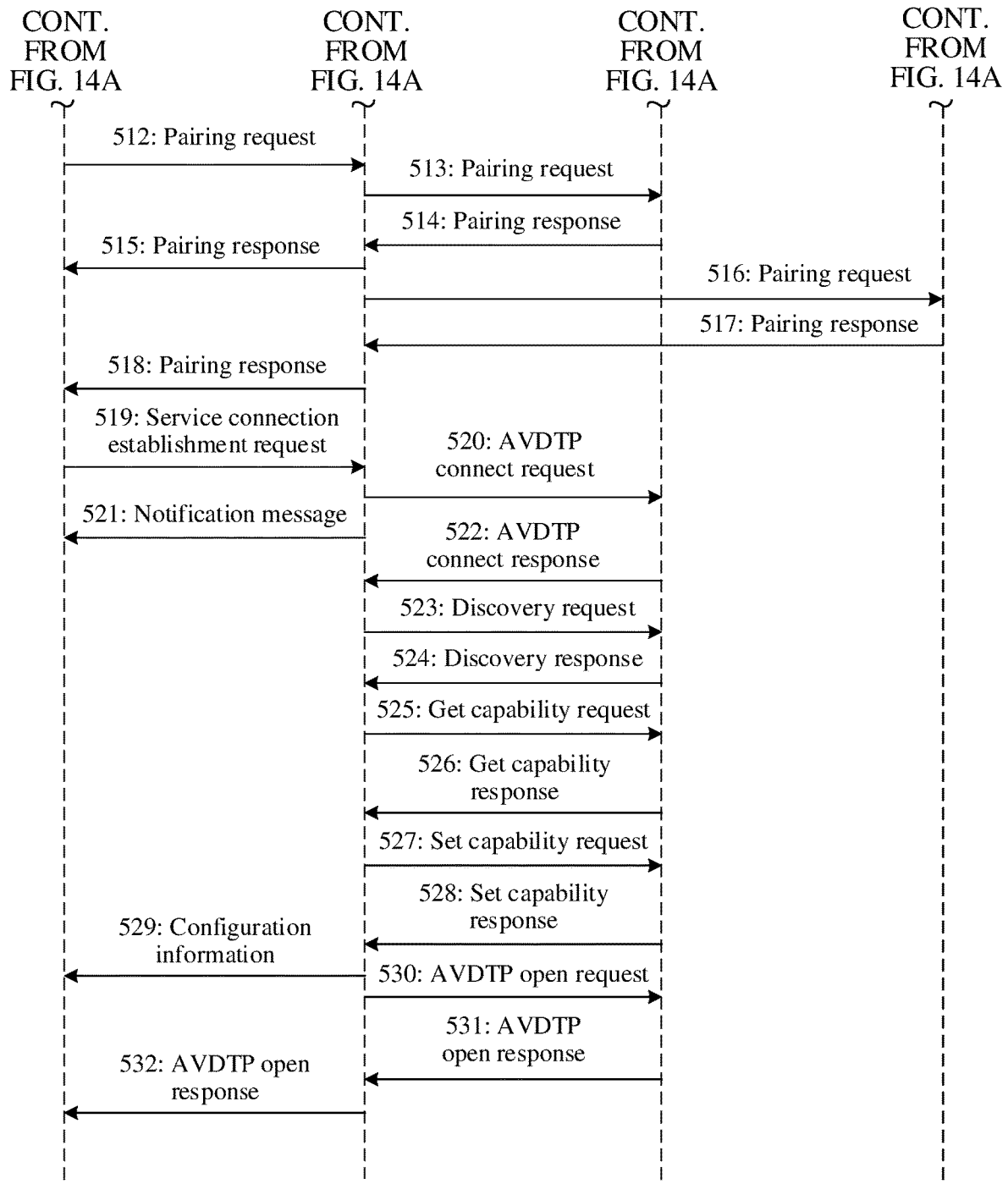

FIG. 14A and FIG. 14B are a flowchart of another service connection establishment method according to an embodiment of this application. In this embodiment, a device combination includes a Bluetooth slave device 1 and a Bluetooth slave device 2. In a service connection establishment phase, after a Bluetooth protocol stack of a Bluetooth master device completes all sub-states of a service connection with one Bluetooth device in the device combination, the Bluetooth protocol stack of the Bluetooth master device completes all sub-states of the service connection with another Bluetooth slave device. This embodiment includes the following steps.

500: A Bluetooth application module receives a first operation entered by a user.

The first operation is used to request to enable a Bluetooth function.

501: The Bluetooth application module of the Bluetooth master device sends a scanning command to the Bluetooth protocol stack of the Bluetooth master device.

502: The Bluetooth protocol stack of the Bluetooth master device starts a Bluetooth scanning process.

503: The Bluetooth protocol stack of the Bluetooth master device obtains a scanning result of the Bluetooth slave device 1.

504: The Bluetooth protocol stack of the Bluetooth master device determines whether tag information in the scanning result is the same as tag information of the Bluetooth master device. If the tag information in the scanning result is the same as the tag information of the Bluetooth master device, step 505 is performed. If the tag information in the scanning result is different from the tag information of the Bluetooth master device, step 507 is performed.

505: The Bluetooth protocol stack of the Bluetooth master device stores the tag information, and performs step 506.

506: The Bluetooth protocol stack of the Bluetooth master device reports the scanning result including the tag information to the Bluetooth application module of the Bluetooth master device.

507: The Bluetooth protocol stack of the Bluetooth master device obtains a scanning result of the Bluetooth slave device 2.

508: The Bluetooth protocol stack of the Bluetooth master device determines whether tag information in the scanning result is the same as tag information of the Bluetooth master device. If the tag information in the scanning result is the same as the tag information of the Bluetooth master device, step 509 is performed. If the tag information in the scanning result is different from the tag information of the Bluetooth master device, step 511 is performed.

509: The Bluetooth protocol stack of the Bluetooth master device stores address information of the Bluetooth slave device 2.

After receiving the tag information that is included in the scanning result of each Bluetooth slave device and that is reported by the Bluetooth protocol stack, the Bluetooth application module considers Bluetooth slave devices that include the same tag information as Bluetooth slave devices in a same device combination. For example, in the foregoing embodiment, the scanning result of the Bluetooth slave device 1 and the scanning result of the Bluetooth slave device 2 include the same tag information, and after obtaining the two scanning results, the Bluetooth application module considers that the Bluetooth slave device 1 and the Bluetooth slave device 2 are included in a same device combination.

The foregoing steps 501 to 509 may be understood as the scanning phase. For details, refer to the description of the scanning phase in FIG. 6A and FIG. 6B.

510: The Bluetooth protocol stack of the Bluetooth master device reports the scanning result of the Bluetooth slave device 2 to the Bluetooth application module, where the scanning result includes the tag information.

511: The Bluetooth application module of the Bluetooth master device receives a second operation entered by the user.

The second operation is used to request the Bluetooth protocol stack to pair with each of Bluetooth slave devices in the device combination.

512: The Bluetooth application module of the Bluetooth master device sends a pairing request for the Bluetooth slave device 1 to the Bluetooth protocol stack of the Bluetooth master device.

513: The Bluetooth protocol stack of the Bluetooth master device sends the pairing request to the Bluetooth slave device 1.

514: The Bluetooth protocol stack of the Bluetooth master device receives a pairing response of the Bluetooth slave device 1.

515: The Bluetooth protocol stack of the Bluetooth master device sends the pairing response of the Bluetooth slave device 1 to the Bluetooth application module of the Bluetooth master device.

516: The Bluetooth application module of the Bluetooth master device sends a pairing request for the Bluetooth slave device 2 to the Bluetooth protocol stack of the Bluetooth master device.

517: The Bluetooth protocol stack of the Bluetooth master device receives a pairing response sent by the Bluetooth slave device 2.

518: The Bluetooth protocol stack of the Bluetooth master device sends the pairing response of the Bluetooth slave device 2 to the Bluetooth application module of the Bluetooth master device.

The foregoing steps 511 to 518 may be understood as the pairing phase.

519: The Bluetooth application module of the Bluetooth master device sends a service connection establishment request to the Bluetooth protocol stack of the Bluetooth master device.

The AVDTP service connection in FIG. 11 is still used as an example. This embodiment further includes the following steps.

520: The Bluetooth protocol stack sends an AVDTP connect request to the Bluetooth slave device 1.

521: The Bluetooth protocol stack indicates the Bluetooth application module to report a notification message.

The notification message is used to notify the Bluetooth application module that the Bluetooth protocol stack is processing the connect request in step 519.

The Bluetooth application module of the Bluetooth master device receives the notification message, and for an A2DP, a service connection of the Bluetooth application module switches from a disconnecting state to a connecting state.

522: The Bluetooth protocol stack of the Bluetooth master device receives an AVDTP connect response sent by the Bluetooth slave device 1.

523: The Bluetooth protocol stack of the Bluetooth master device sends a discovery request to the Bluetooth slave device 1.

For example, after receiving the connect response sent by the Bluetooth slave device 1, the Bluetooth protocol stack of the Bluetooth master device sends the discovery request to the Bluetooth slave device 1.

524: The Bluetooth slave device 1 sends a discovery response to the Bluetooth protocol stack of the Bluetooth master device.

The foregoing steps 523 and 524 may be understood as a process in which the Bluetooth master device executes a discovery sub-state with the Bluetooth slave device 1.

525: The Bluetooth protocol stack of the Bluetooth master device sends a get capability request to the Bluetooth slave device 1.

For example, after receiving the discovery response sent by the Bluetooth slave device 1, the Bluetooth protocol stack of the Bluetooth master device sends the get capability request to the Bluetooth slave device 1.

526: The Bluetooth slave device 1 sends a get capability response to the Bluetooth protocol stack of the Bluetooth master device.

The foregoing steps 525 and 526 may be understood as a process in which the Bluetooth master device executes the get capability sub-state for the Bluetooth slave device 1.

527: The Bluetooth protocol stack of the Bluetooth master device sends a set capability request to the Bluetooth slave device 1.

For example, after receiving the get capability response sent by the Bluetooth slave device 1, the Bluetooth protocol stack of the Bluetooth master device sends the set capability request to the Bluetooth slave device 1.

528: The Bluetooth slave device 1 sends a set capability response to the Bluetooth protocol stack of the Bluetooth master device.

The set capability response carries configuration information of the Bluetooth slave device 1, and the configuration information carries an encoding parameter required for an AVDP service connection, and the like.

529: The Bluetooth protocol stack of the Bluetooth master device reports configuration information to the Bluetooth application module of the Bluetooth master device.

The foregoing steps 527 to 529 may be understood as a process in which the Bluetooth master device executes the set capability sub-state for the Bluetooth slave device 1.

530: The Bluetooth protocol stack of the Bluetooth master device sends an AVDTP open request to the Bluetooth slave device 1.

For example, after receiving the get capability response sent by the Bluetooth slave device 1, the Bluetooth protocol stack of the Bluetooth master device sends the AVDTP open request to the Bluetooth slave device 1.

531: The Bluetooth slave device 1 sends an AVDTP open response to the Bluetooth protocol stack of the Bluetooth master device.

The Bluetooth master device receives the AVDTP open response reported by the Bluetooth slave device 1. The AVDTP open response indicates that the Bluetooth master device completes the AVDTP service connection with the Bluetooth slave device 1.

532: The Bluetooth protocol stack of the Bluetooth master device sends the AVDTP open response to the Bluetooth application module of the Bluetooth master device.

Then, the Bluetooth master device performs the foregoing steps 520 to 532 with the Bluetooth slave device 2, until the Bluetooth master device receives an AVDTP open response reported by the Bluetooth slave device 2. The AVDTP open response indicates that the Bluetooth master device and the Bluetooth slave device 2 complete the AVDTP service connection.

The foregoing steps 519 to 532 may be understood as a service connection establishment process.

In this embodiment, in the service connection establishment stage, a service connection process between the Bluetooth master device and each of Bluetooth slave devices in the device combination is independently completed, and service logic establishment logic of a single Bluetooth slave device is not changed. A disconnection of each of Bluetooth slave devices in the device combination is similar to a disconnection of a single Bluetooth slave device.

Figure 15:
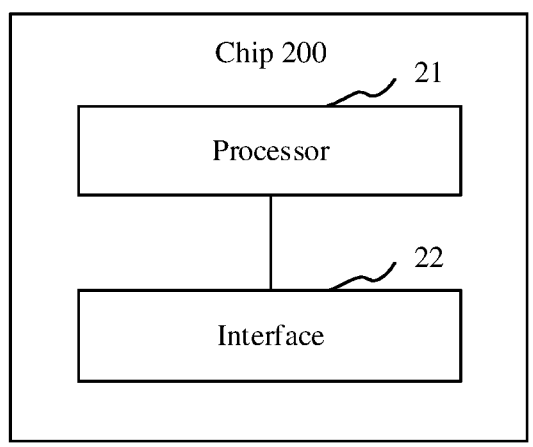
FIG. 15 is an example schematic structural diagram of a chip according to an embodiment of this application.

FIG. 15 is a schematic structural diagram of a chip according to an embodiment of this application. A chip 200 provided in this embodiment includes a processor 21 and an interface 22. The interface 22 is configured to receive code instructions, and transmit the code instructions to the processor 21. The processor 21 runs the code instructions to perform the following steps: receiving a first operation entered by a user, where the first operation is used to request to enable a Bluetooth function; displaying flag information of a scanned device combination, where the device combination includes a first Bluetooth slave device and a second Bluetooth slave device; receiving a second operation entered by the user, where the second operation is used to request the Bluetooth master device to pair with each of Bluetooth slave devices in the device combination; and establishing a service connection with each of Bluetooth slave devices in the device combination.

For example, for this, refer to the descriptions in FIG. 3 and FIG. 4.

In the embodiments of this application, the processor 21 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The universal processor may be a microprocessor or any conventional processor or the like. The steps of the methods disclosed with reference to the embodiments of this application may be directly performed and accomplished by using a hardware processor, or may be performed and accomplished by using a combination of hardware and software modules in the processor.

In the embodiments of this application, the memory (not shown) may be a non-volatile memory, a hard disk drive (HDD) or a solid-state drive (SSD), or may be a volatile memory, for example, a random-access memory (RAM). The memory is any other medium that can carry or store expected program code in a form of an instruction structure or a data structure and that can be accessed by a computer, but is not limited thereto. The memory in this embodiment of this application may alternatively be a circuit or any other apparatus that can implement a storage function, and is configured to store a program instruction and/or data.

All or some of the foregoing methods in the embodiments of this application may be implemented by means of software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the process or functions according to the embodiments of the present invention are all or partially generated. The computer may be a general-purpose computer, a dedicated computer, a computer network, a network device, a user device, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

A person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A Bluetooth master device, comprising:
a processor; and
a memory configured to store computer readable instructions that, when executed by the processor, cause the device to:
receive a first operation entered by a user, wherein the first operation is used to request to enable a Bluetooth function;
display tag information of a scanned device combination, wherein the tag information includes an identifier of the scanned device combination, and the scanned device combination includes a first Bluetooth slave device and a second Bluetooth slave device;
receive a second operation entered by the user;
pair with each of the first and second Bluetooth slave devices, in the scanned device combination, based on the second operation entered by the user; and
establish a service connection with each of the first and second Bluetooth slave devices in the scanned device combination.

2. The Bluetooth master device according to claim 1, wherein the tag information is comprised in a scanning result of the first Bluetooth slave device, and before displaying the tag information of the scanned device combination, the processor is further caused to:
store address information of the second Bluetooth slave device, wherein the address information is comprised in a scanning result of the second Bluetooth slave device.

3. The Bluetooth master device according to claim 2, wherein pairing with each of the first and second Bluetooth slave devices in the scanned device combination comprises:
pairing with the first Bluetooth slave device;
determining whether the pairing with the first Bluetooth slave device is completed; and if the pairing with the first Bluetooth slave device is completed, automatically pairing with the second Bluetooth slave device based on the address information of the second Bluetooth slave device.

4. The Bluetooth master device according to claim 1, wherein the service connection comprises a plurality of sub-states, and establishing the service connection with each of the first and second Bluetooth slave devices in the scanned device combination comprises:
separately executing a first sub-state with the first Bluetooth slave device and the second Bluetooth slave device; and
after separately executing the first sub-state with the first Bluetooth slave device and the second Bluetooth slave device, separately executing a second sub-state with the first Bluetooth slave device and the second Bluetooth slave device, wherein the first sub-state and the second sub-state are different sub-states among the plurality of sub-states.

5. The Bluetooth master device according to claim 1, wherein the service connection comprises a plurality of sub-states, and establishing the service connection with each of the first and second Bluetooth slave devices in the scanned device combination comprises:
executing all of the plurality of sub-states with the first Bluetooth slave device; and
after executing all of the plurality of sub-states with the first Bluetooth slave device, executing all of the plurality of sub-states with the second Bluetooth slave device.

6. The Bluetooth master device according to claim 1, wherein establishing the service connection with each of the first and second Bluetooth slave devices in the scanned device combination comprises:
pairing with each of the first and second Bluetooth slave devices in the scanned device combination based on a sequence of scanned Bluetooth slave devices in the scanned device combination.

7. A chip, comprising:
a processor; and
an interface, wherein
the interface is configured to receive code instructions and transmit the code instructions to the processor, and
the processor is configured to run the code instructions to:
receive a first operation entered by a user, wherein the first operation is used to request to enable a Bluetooth function;
display tag information of a scanned device combination, wherein the tag information includes an identifier of the scanned device combination, and the scanned device combination includes a first Bluetooth slave device and a second Bluetooth slave device;
receive a second operation entered by the user, wherein the second operation is used to request a Bluetooth master device to pair with each of the first and second Bluetooth slave devices in the scanned device combination;
pair with each of the first and second Bluetooth slave devices in the scanned device combination; and
establish a service connection with each of the first and second Bluetooth slave devices in the scanned device combination.

8. The chip according to claim 7, wherein the tag information is comprised in a scanning result of the first Bluetooth slave device, and before displaying the tag information of the scanned device combination, the processor is further configured to:
store address information of the second Bluetooth slave device, wherein the address information is comprised in a scanning result of the second Bluetooth slave device.

9. The chip according to claim 8, wherein pairing with each of the first and second Bluetooth slave devices in the scanned device combination comprises:
pairing with the first Bluetooth slave device;
determining whether the pairing with the first Bluetooth slave device is completed; and
if the pairing with the first Bluetooth slave device is completed, automatically pairing with the second Bluetooth slave device based on the address information of the second Bluetooth slave device.

10. The chip according to claim 7, wherein the service connection comprises a plurality of sub-states, and establishing the service connection with each of the first and second Bluetooth slave devices in the scanned device combination comprises:
separately executing a first sub-state with the first Bluetooth slave device and the second Bluetooth slave device; and
after separately executing the first sub-state with the first Bluetooth slave device and the second Bluetooth slave device, separately executing a second sub-state with the first Bluetooth slave device and the second Bluetooth slave device, wherein the first sub-state and the second sub-state are different sub-states among the plurality of sub-states.

11. The chip according to claim 7, wherein the service connection comprises a plurality of sub-states, and establishing the service connection with each of the first and second Bluetooth slave devices in the scanned device combination comprises:
executing all of the plurality of sub-states with the first Bluetooth slave device; and
after executing all of the plurality of sub-states with the first Bluetooth slave device, executing all of the plurality of sub-states with the second Bluetooth slave device.

12. The chip according to claim 7, wherein establishing the service connection with each of the first and second Bluetooth slave devices in the scanned device combination comprises:
pairing with each of the first and second Bluetooth slave devices in the scanned device combination based on a sequence of scanned Bluetooth slave devices in the scanned device combination.

13. A service connection establishment method, applicable to a Bluetooth master device, the Bluetooth master device including a Bluetooth application module and a Bluetooth protocol stack, and the service connection establishment method comprising:
receiving, by the Bluetooth application module, a first operation entered by a user, wherein the first operation is used to request to enable a Bluetooth function;
sending, by the Bluetooth application module, a scanning request to the Bluetooth protocol stack, wherein the scanning request is used to request the Bluetooth protocol stack to perform Bluetooth scanning;
reporting, by the Bluetooth protocol stack, a scanning result to the Bluetooth application module, wherein the scanning result is a scanning result of any one of a first Bluetooth slave device and a second Bluetooth slave device, and the first Bluetooth slave device and the second Bluetooth slave device are comprised in a device combination;

controlling, by the Bluetooth application module, a user interface of the Bluetooth master device to display tag information of the device combination, wherein the tag information of the device combination is carried in the scanning result, and the tag information includes an identifier of the device combination;

receiving, by the Bluetooth application module, a second operation entered by the user, wherein the second operation is used to request the Bluetooth protocol stack to pair with each of the first and second Bluetooth slave devices in the device combination;

receiving, by the Bluetooth application module, a pairing result from the Bluetooth protocol stack, wherein the pairing result is sent after the Bluetooth protocol stack is paired with each of the first and second Bluetooth slave devices in the device combination, and the pairing result is a pairing result of any Bluetooth slave device in the first Bluetooth slave device and the second Bluetooth slave device; and establishing, by the Bluetooth protocol stack, a service connection with each of the first and second Bluetooth slave devices in the device combination.

14. The service connection establishment method according to claim 13, wherein the scanning result is a scanning result of the first Bluetooth slave device, and after reporting, by the Bluetooth protocol stack, the scanning result to the Bluetooth application module, the method further comprises:

storing, by the Bluetooth protocol stack, address information of the second Bluetooth slave device, wherein the address information is comprised in a scanning result of the second Bluetooth slave device.

15. The service connection establishment method according to claim 14, wherein before receiving, by the Bluetooth application module, the pairing result from the Bluetooth protocol stack, the method further comprises:

pairing, by the Bluetooth protocol stack, with the first Bluetooth slave device;

determining, by the Bluetooth protocol stack, whether the pairing with the first Bluetooth slave device is completed; and if the Bluetooth protocol stack determines that the pairing with the first Bluetooth slave device is completed, automatically pairing with the second Bluetooth slave device based on the address information of the second Bluetooth slave device.

16. The service connection establishment method according to claim 13, wherein the service connection comprises a plurality of sub-states, and establishing, by the Bluetooth protocol stack, the service connection with each of the first and second Bluetooth slave devices in the device combination comprises:

separately executing, by the Bluetooth protocol stack, a first sub-state with the first Bluetooth slave device and the second Bluetooth slave device; and after the Bluetooth protocol stack separately executes the first sub-state with the first Bluetooth slave device and the second Bluetooth slave device, separately executing, by the Bluetooth protocol stack, a second sub-state with the first Bluetooth slave device and the second Bluetooth slave device, wherein the first sub-state and the second sub-state are different sub-states among the plurality of sub-states.

17. The service connection establishment method according to claim 16, wherein after separately executing, by the Bluetooth protocol stack, the first sub-state with the first Bluetooth slave device and the second Bluetooth slave device, the method further comprises:

sending, by the Bluetooth protocol stack, an execution result of the first sub-state to the Bluetooth application module.

18. The service connection establishment method according to claim 13, wherein the service connection comprises a plurality of sub-states, and establishing, by the Bluetooth protocol stack, the service connection with each of the first and second Bluetooth slave devices in the device combination comprises:

executing, by the Bluetooth protocol stack, all of the plurality of sub-states with the first Bluetooth slave device; and after the Bluetooth protocol stack completes execution of all of the plurality of sub-states with the first Bluetooth slave device, executing, by the Bluetooth protocol stack, all of the plurality of sub-states with the second Bluetooth slave device.

19. The service connection establishment method according to claim 18, wherein after executing, by the Bluetooth protocol stack, all of the plurality of sub-states with the first Bluetooth slave device, the method further comprises:

sending, by the Bluetooth protocol stack, a service connection result of the first Bluetooth slave device to the Bluetooth application module.

20. The service connection establishment method according to claim 13, wherein establishing, by the Bluetooth protocol stack, the service connection with each of the first and second Bluetooth slave devices in the device combination comprises:

pairing, by the Bluetooth protocol stack, with each of the first and second Bluetooth slave devices in the device combination based on a sequence of scanned Bluetooth slave devices in the device combination.

* * * * *